(12) United States Patent
Onoe

(10) Patent No.: US 8,085,630 B2
(45) Date of Patent: Dec. 27, 2011

(54) OPTICAL DISK APPARATUS

(75) Inventor: Shisuke Onoe, Fujisawa (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 116 days.

(21) Appl. No.: 12/622,122

(22) Filed: Nov. 19, 2009

(65) Prior Publication Data
US 2010/0172223 A1 Jul. 8, 2010

(30) Foreign Application Priority Data
Jan. 8, 2009 (JP) ................................ 2009-002122

(51) Int. Cl.
*G11B 7/00* (2006.01)
(52) U.S. Cl. .................................. 369/44.29; 369/44.32
(58) Field of Classification Search .................... None
See application file for complete search history.

(56) References Cited

U.S. PATENT DOCUMENTS

| 6,563,663 | B1 * | 5/2003 | Bi et al. | 360/77.04 |
| 6,845,068 | B2 * | 1/2005 | Watanabe | 369/44.34 |
| 2002/0024899 | A1 * | 2/2002 | Cho et al. | 369/44.32 |
| 2002/0181350 | A1 * | 12/2002 | Ikai et al. | 369/44.32 |
| 2007/0183284 | A1 | 8/2007 | Nishimura et al. | |
| 2008/0279059 | A1 * | 11/2008 | Zhou | 369/44.32 |
| 2009/0154313 | A1 * | 6/2009 | Onoe | 369/44.32 |
| 2010/0172223 | A1 * | 7/2010 | Onoe | 369/44.32 |

FOREIGN PATENT DOCUMENTS

| JP | 08-077589 | 3/1996 |
| JP | 11-213403 | 8/1999 |
| JP | 2001-084620 | 3/2001 |
| JP | 2001-126421 | 5/2001 |
| JP | 2002-197682 | 7/2002 |
| JP | 2003-067951 | 3/2003 |

* cited by examiner

*Primary Examiner* — Peter Vincent Agustin
(74) *Attorney, Agent, or Firm* — Kilpatrick Townsend & Stockton LLP

(57) ABSTRACT

A servo control of an optical disk apparatus increases a suppression degree of an iterative learning control system, against a frequency disturbance of integer multiple of rotation frequency in a predetermined rotation phase range including a range, in which a servo deviation is detected, of the rotation phase.

18 Claims, 18 Drawing Sheets

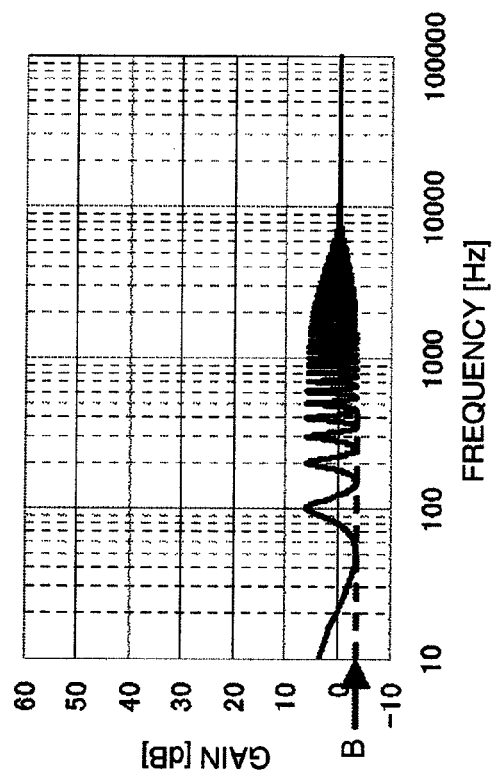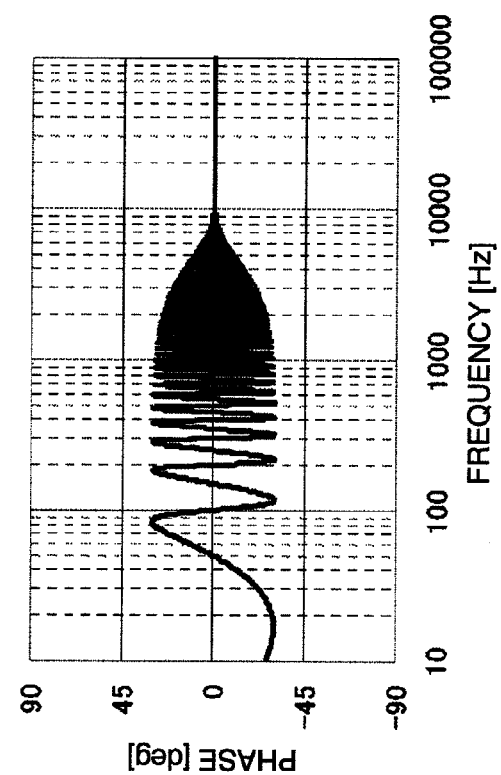
FIG.13A
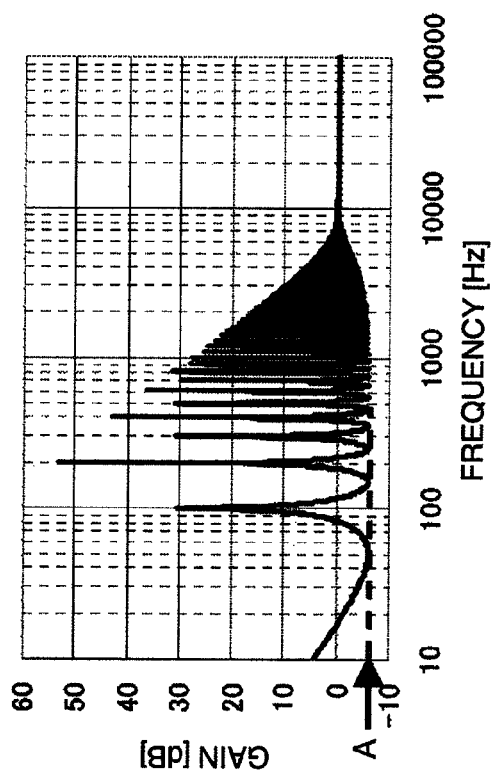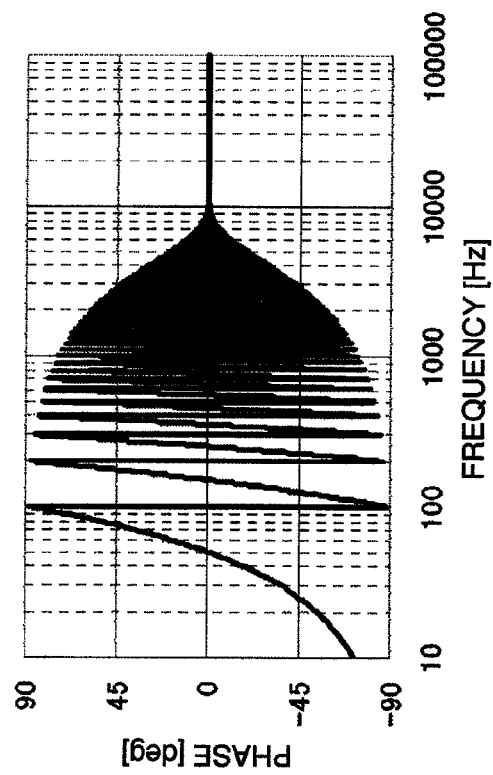
FIG.13B

OPTICAL DISK APPARATUS

INCORPORATION BY REFERENCE

The present application claims priority from Japanese application JP2009-002122 filed on Jan. 8, 2009, the content of which is hereby incorporated by reference into this application.

BACKGROUND OF THE INVENTION

The present invention relates to an optical disk apparatus for recording and/or reproducing information in and/or from an optical disk.

As one of the causes of a servo follow-up deviation in the optical disk apparatus, a periodic disturbance is included therein, which is caused by rotating the optical disk. There has been a method that makes a servo gain high to increase an allowable disturbance amount, as one of the methods for enhancing a follow-up performance against the periodic disturbance.

In contrast, JP-A-2001-84620 has disclosed that "It is necessary to raise a cutoff frequency since a servo band is more broadened when a reproduction speed of DVD is made high. For example, an oscillation is inevitable when a resonance appears by setting the cutoff frequency to 10 kHz."

As another method of enhancing the follow-up performance against the periodic disturbance, the iterative learning control has been known beforehand.

JP-A-11-213403 has discloses a technique that detects a vibration equal to or greater than a predetermined value in which the vibration is added externally to an optical disk apparatus, discontinues an operation that increases a gain of a rotational frequency range in the optical disk in accordance with the detected signal, and increases an entire servo band of a servo control.

JP-A-8-77589 has disclosed a technique that varies a learning level of a iterative learning control, and turns down the learning level thereof when a track correlation is weak.

JP-A-2001-126421 has discloses the iterative learning control that provides a configuration including an adder that adds an output signal of a filter to a position error signal (PES), which is not delayed, to output to a delay memory device as a new inner state signal.

On the other hand, it is known that there is a component so called deviation, other than an eccentricity/surface run-out component as the periodic disturbance component occurred at a time of rotating the optical disk. U.S. patent application Publication No. 2007/0183284 has disclosed that "In the case of optical disk having a guide groove, a defective portion (deviation) in a groove shape is sometimes included by causing a deterioration of disk stamper, a disk forming defect, etc. A wide band inherent noise component is mixed in a groove reflected signal at an outer circumference portion of the disk in particular, when the above-mentioned disk is rotated in high operation speed."

Further, JP-A-2003-67951 has disclosed a method that calculates a defect zone, decreases a loop gain of the servo control in the calculated defect zone to turn down the cutoff frequency, and turns up the loop gain in other than the defect zone to make the cutoff frequency high.

SUMMARY OF THE INVENTION

There are three problems to be targeted to the invention. A first problem is that it is difficult to take simultaneous pursuit for a suppression of the component so called deviation and a servo stability on the high operation speed. A component, which is not completely suppressed by the servo system, is appeared as a residue error in a servo error signal for use in a control of a focusing system/tracking system. For this reason, a signal variation component of a rotation frequency is monitored in the servo error signal when the eccentricity/surface run-off component is present on the optical disk. Likewise, a signal variation of high frequency is monitored in the servo error signal when a partial deformation (hereinafter, refer to as deviation) is present on the disk track.

FIG. 18 is a pattern diagram showing the servo error signal at a time of a deviation pass, in which $V_{ref}$ is a reference level of the servo error signal. Hereinafter, the signal variation component in high frequency, which is monitored in the servo error signal on the deviation pass, is referred to as a deviation component. The deviation component corresponds to an A portion in FIG. 18. Referring to FIG. 18, the deviation component arises in synchronism with a rotation period to thereby become a substantially equal signal variation waveform at every rotation period. This is because the deviation arises at a specific angle on one rotation of the disk and the track is also deformed with the substantially same shape in adjacent tracks, since the deviation is a localized deformation caused by a disk manufacturing process.

The deviation component has a low frequency in comparison with the disturbance component such as a defect and scratch, therefore, it is effective to follow up the track with increase of the servo gain, as a measure. On the other hand, the disturbance component of the defect and scratch has high frequency, therefore, the servo gain is turned down to make a servo response small, and the follow-up should not be performed forcibly, which becomes an effective measure.

The deviation component has a signal waveform synchronized with the rotation period so that it can be represented by a sum of the rotation frequency and its high-order component operated by Fourier transform, therefore, it is possible to suppress the deviation component by the iterative learning control.

A physical accuracy in a focusing/tracking direction of the track, which is followed up by the optical disk apparatus, is ruled as a specification of the optical disk. Therefore, it is assured that the optical disk conformed to the specification can be suppressed by using a server characteristic ruled in the specification. However, there is a possibility that the optical disk having the deviation insufficient in the specification is being marketed. In this case, an excellent follow-up performance more than rules in the specification is required as a servo performance of the optical disk apparatus.

In contrast, there has also been a demand such that a time required for the record and reproduction should be made short, by performing the record and reproduction in an operation speed faster than the predetermined specification for use in the optical disk conformed to the specification. In also this case, the excellent follow-up performance better than an expected performance of the standard specification is required.

As described above, when the excellent follow-up performance better than the expected performance of the standard specification is required as the servo performance of the optical disk apparatus, it is required to increase the servo gain and turn up a suppression degree. As disclosed in the JPA-2001-84620, the faster the operation speed, the higher the servo gain required for the follow-up becomes. However, a sub-resonance is present in an actuator of the optical disk apparatus, therefore, the servo stability is deteriorated to give rise to a phenomenon of the oscillation etc. at a sub-resonance frequency, when the servo gain is further turned up from the high state of servo gain as a steady characteristic. For this reason, it is difficult to further turn up the servo gain from the steady state on the high operation speed, in particular. In consequence, a suppression gain is short, in particular, against the high frequency disturbance like the deviation component, and a phenomenon, in which the servo is displaced since the follow-up cannot be performed against the disturbance, occurs in the worst case. As described above, it is difficult to take simultaneous pursuit for the deviation suppression and the servo stability on the high operation speed, which is the first problem.

In order to handle this problem, the inventor(s) has found that a request for turning up the suppression degree for the deviation component is demanded by using the iterative learning control. Of the problems targeted by the invention, the after-mentioned second and third problems are a problem to suppress the deviation component by the iterative learning control.

The second problem is relative to a suppression speed for the deformation of deviation waveform. The deviation component becomes substantially equal waveforms at every rotation period, but they are not completely matched with each other. The deviation waveforms are sometimes deformed at every rotation period. For this reason, the inventor(s) has found that a request for immediately suppressing the deviation component is demanded in this case even though the waveforms of deviation component are deformed at every rotation period on the performance of iterative learning control.

The third problem is relative to the follow-up performance against the disturbance of frequency component which is not synchronized with the rotation. The iterative learning control has a suppression effect when the disturbance of frequency component (hereinafter, refer to rotation synchronous component) synchronized with the rotation is entered into the servo system. In contrast, when the disturbance of frequency component (hereinafter, refer to rotation asynchronous component) not synchronized with the rotation is entered into the servo system, it is known that the follow-up performance is deteriorated even in comparison with the case where the iterative learning control is not used. The rotation asynchronous component includes an impact, a vibration, etc. Even though both the rotation synchronous component and the rotation asynchronous component are entered into the servo system, the optical disk apparatus, which suppresses the deterioration of follow-up performance to minimum, has been desirable.

From the above description, the inventor(s) has assumed an optical disk apparatus which is difficult to turn up the servo gain from the steady state, and has found that it is demanded that a configuration of the optical disk apparatus has both a steady suppression performance of the deviation and a smooth suppression performance for the deformation of deviation waveform at every rotation period to thereby suppress the deterioration of follow-up performance in minimum even when the rotation asynchronous component is further added to the servo system.

In order to solve the above-mentioned problem, the JP-A-11-213403 has proposed as a method, for example. This method is performed such that a vibration as added externally is detected to discontinue an output from the iterative learning control, at the same time, increase the gain of entire servo band of the servo control. However, in consideration of the case where the deviation component of high frequency is entered into the servo system as a disturbance, there is a problem that an oscillation phenomenon is inevitable at the sub-resonance frequency as described above so that the suppression is performed by only varying the servo gain without using the iterative learning control.

Further, the JP-A-8-77589 has proposed as another method. This method is performed such that an attenuation amount is made small in a feed forward loop of a learning compensation unit when an unexpected disturbance is applied to the optical disk, such as a vibration, a scratch of the disk, etc., however, the method is also not considered of the deviation component. When the record and reproduction are performed for the optical disk having the deviation by the optical disk apparatus which is performed under a condition where the steady rotation asynchronous vibration is added, such as vehicle-mounted devices, there is a problem that the suppression for the deviation component is short to thereby displace the servo since the above-mentioned attenuation amount becomes always small.

Further, the JP-A-2003-67951 has proposed as still another method. This method is performed such that the defect zone is calculated to thereby turn down the loop gain of servo control in the calculated defect zone. Since it is effective that the servo gain is turned up in the case of the deviation component, a deviation zone is calculated to turn up the loop gain of the servo control in the calculated deviation zone when this method is applied to this problem. When "the loop gain is turned up," it is meant that "the gain of entire servo band is increased" in general. When the gain of entire servo band is turned up, it is effective to increase the suppression degree at all of the frequencies in the servo band. That is, it is possible to enhance the follow-up performance for any of the deviation component, rotation synchronous component or rotation asynchronous component. In contrast, even when the attenuation amount is made large in the feed forward loop of the learning compensation unit, a characteristic which increases the gain is obtained only at the high-order frequency of the rotation frequency, not an entire servo band. In this case, there is a drawback that the follow-up performance is deteriorated for the rotation asynchronous component. Therefore, when "the loop gain is turned up" generally, it is meant that "the gain is increased for the entire servo band."

In consideration of increasing the gain of the entire servo band in the calculated deviation zone, there is a problem that the oscillation state occurs at the sub-resonance frequency on the high operation speed, as described above. It is required that the oscillated phenomenon in the servo is avoided even in only the zone in which the deviation is detected. For this reason, there is a problem that this method cannot be employed on the high operation speed.

Further, the JP-A-2001-126421 has proposed as still another method. In this method, the configuration of iterative learning control system provides an adder for adding an output signal of the delay memory device to the position error signal which is not delayed to obtain the new inner state signal and output to the delay memory device. The gain in a multiplier, which multiplies a gain by an output signal from the iterative learning control, is further made small so that the deterioration of follow-up performance is avoided for the rotation asynchronous component. However, there is a drawback that a convergence of the learning becomes slow in this method. For this reason, it is difficult to respond to the case where the waveform of deviation component is varied at every rotation period on the performance of iterative learning control.

In light of the above-mentioned problems, an object of the invention is to enhance the track follow-up performance of the optical disk apparatus using the iterative learning control.

The object of the invention can be achieved by increasing the suppression degree of the iterative learning control system against the frequency disturbance in terms of an integral multiple of the rotation frequency, in a predetermined rotation phase range containing a rotation phase range in which a servo disturbance is detected, as an example.

According to the invention, the track follow-up performance can be enhanced in the optical disk apparatus.

The other objects, features and advantages of the invention will become apparent from the following description of the embodiments of the invention taken in conjunction with the accompanying drawings.

BRIEF DESCRIPTION OF THE DRAWINGS

FIGS. 13A and 13B are the Bode diagrams a single iterative learning control in the first embodiment of the invention;

DESCRIPTION OF THE EMBODIMENTS

Hereinafter, embodiments of an optical disk apparatus in the invention will be described with reference to the drawings.

The invention is applicable to both a radial tracking servo control and an axial tracking servo control, but the tracking control will be described in the embodiments.

First Embodiment

Figure 1:
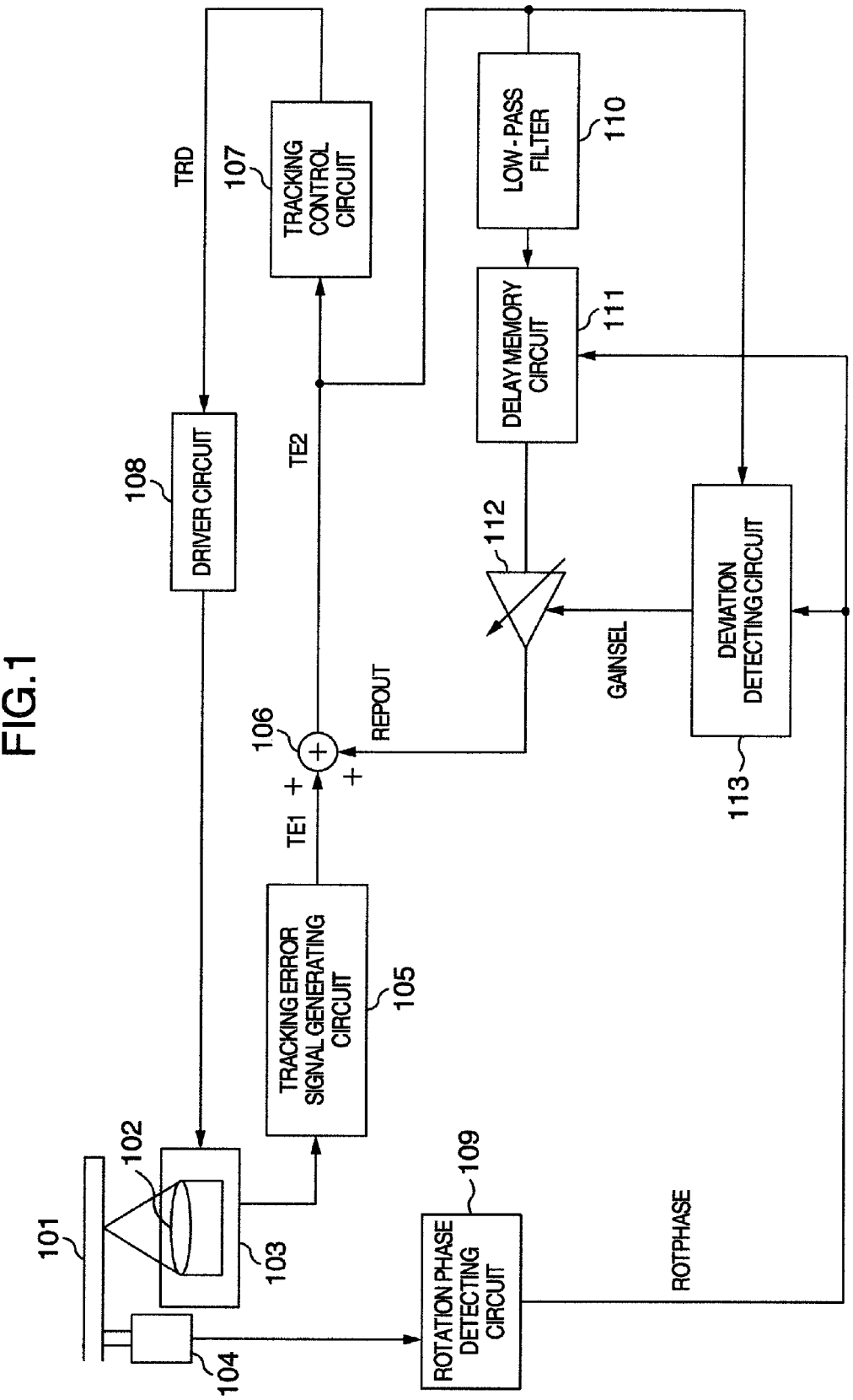
FIG. 1 is a block diagram showing an optical disk apparatus in a first embodiment of the invention.

FIG. 1 is a block diagram showing an optical disk apparatus in a first embodiment.

A reference numeral 101 denotes an optical disk for reading, erasing, or writing information by irradiating a laser beam thereon.

A numeral 102 denotes an object lens which collects the laser beam to then focus it on a recording surface of the optical disk 101.

A numeral 103 denotes an optical pickup having a tracking actuator (not shown). The optical pickup 103 detects a reflected beam from the optical disk 101 to output an electric signal in response to a reflected beam amount.

A numeral 104 denotes a spindle motor which rotationally drives the optical disk 101 in a predetermined linear speed. Hereinafter, a rotation period of the spindle motor 104 is represented by $T_{rot}$.

A numeral 105 denotes a tracking error signal generating circuit which generates a tracking error signal TE1 from an output signal of an optical detector in the optical pickup 103 to then output it from there.

A numeral 106 denotes an adder which outputs a signal TE2 obtained from adding the tracking error signal TE1 to a compensation signal REPOUT output from a after-mentioned variable gain 112.

A numeral 107 denotes a tracking control circuit which compensates a gain and a phase for the signal TE2 to generate a drive signal TRD.

A numeral 108 denotes a driver circuit which amplifies the drive signal TRD output from the tracking control circuit 107 to supply to the tracking actuator in the optical pickup 103.

A numeral 109 denotes a rotation phase detecting circuit which generates rotation phase information ROTPHASE from an output signal of the spindle motor 104 to then output it from there. The information ROTPHASE takes values from 0 to N−1 (N is integer equal to or greater than 1) to be set to positional information obtained from equally dividing one rotation of the spindle motor into N.

That is, assuming that a rotation angle of a spindle motor rotating shaft is θ degree (0≦θ<360), a value PH of the information ROTPHASE is calculated by the following expression (1).

$$PH = \text{int}\left(N \times \frac{\theta}{360}\right) \tag{1}$$

(a function int(a) is for giving the maximum integer equal to or less than "a" for an argument "a".) The information ROTPHASE is updated as a value at a period of $T_{rot}/N$.

A numeral 110 denotes a low-pass filter which attenuates a high frequency component contained in the signal TE2.

A numeral 111 denotes a delay memory circuit which fetches an output signal of the low-pass filter 110 on the basis of the information ROTPHASE to divide one rotation into N and store a signal value therein. On the basis of the value stored therein, the delay memory circuit also outputs a signal for compensating a periodic disturbance entering into a servo system in synchronizing with the rotation.

A numeral 112 is a variable gain device which multiplies the output signal of delay memory circuit 111 by a predetermined coefficient K to then output as the compensation signal REPOUT. A value of the predetermined coefficient K set to the variable gain device 112 is varied on the basis of gain switching-over instruction information GAINSEL output from an after-mentioned deviation detecting circuit 113, therefore, the value of K takes an equal to or greater than 0 to an equal to or less than 1.

A numeral 113 denotes the above-mentioned deviation detecting circuit 113 which receives the signal TE2 and the information ROTPHASE to then output the information GAINSEL.

Figure 2:
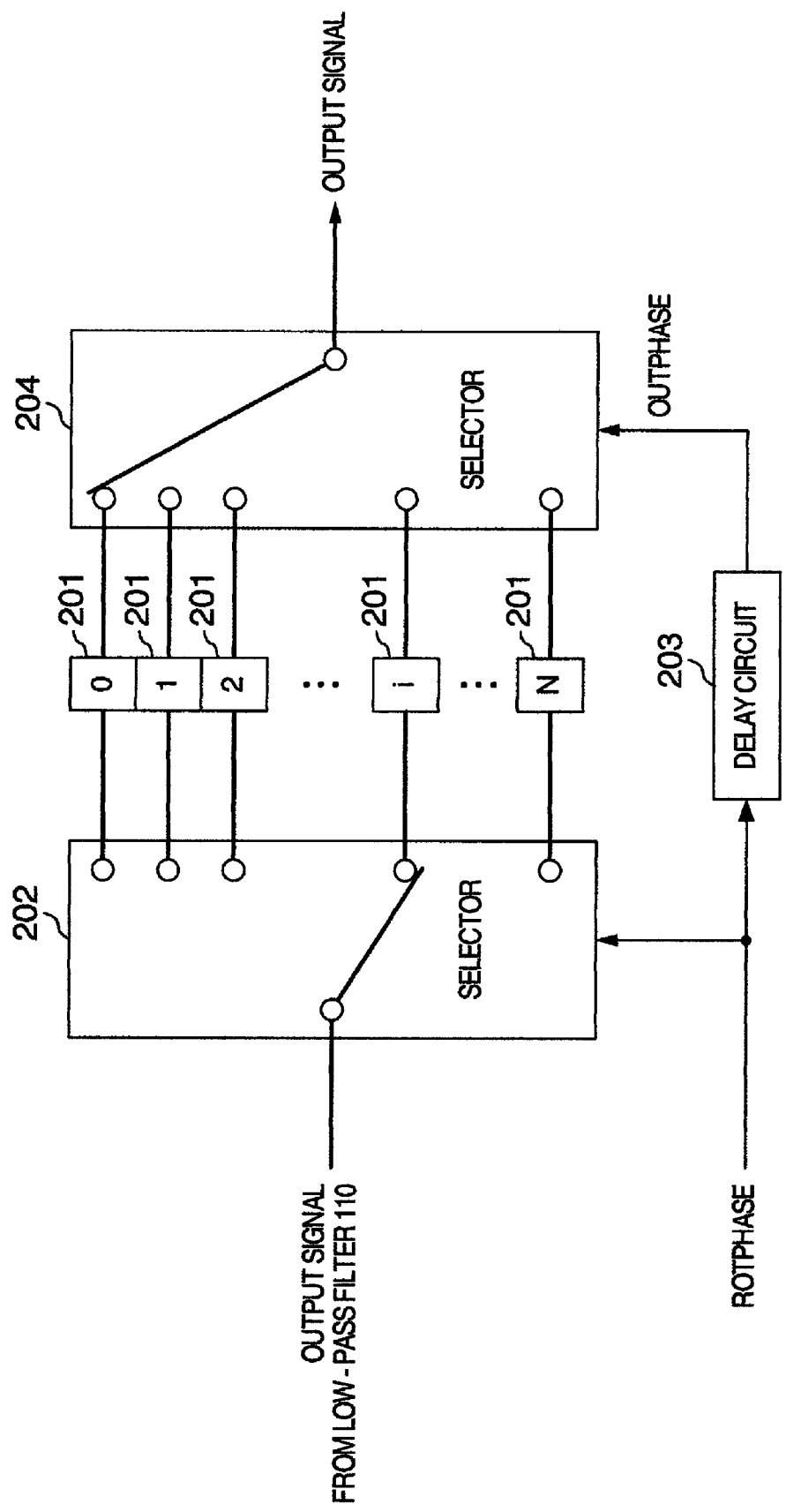
FIG. 2 is a configuration diagram showing a delay memory in the first embodiment of the invention.

Here, the following description will be concerned with the delay memory circuit 111 in this embodiment with reference to FIG. 2.

A reference numeral 201 denotes a memory circuit, and there are N pieces of the memory circuit 201 so that one rotation is divided into N to store these signal values. The memory circuit 201 can be configured by a flash memory in the case where a tracking servo system in this embodiment is realized by a digital servo.

A numeral 202 denotes a first selector which receives the output signal from the low-pass filter 110 to switch over the N pieces of memory circuit 201 by an output from the first selector 202. The first selector 202 selects the memory circuit 201 corresponding to the value of the information ROTPHASE at a timing when varying the value of the information ROTPHASE. The memory circuit 201 selected by the selector 202 stores a value of an input signal at a timing of the selection by the selector 202.

A numeral 203 denote a delay circuit which generates output phase information OUTPHASE as being positional information obtained from delaying the value of the information ROTPHASE by a predetermined time period. Hereinafter, the delay time in delay circuit 203 is represented by $T_{dly}$.

A numeral 204 denotes a second selector which selects the memory circuit 201 corresponding to the value of the information OUTPHASE at a timing when varying the value of the information OUTPHASE, and a value stored in the selected memory circuit 201 is output as an output signal from the delay memory circuit 111.

Next, an operation of the delay circuit 203 will be described with reference to a timing chart in FIG. 3, in which a phase sequence (a) indicates the rotation phase information ROTPHASE, a phase sequence (b) indicates the output phase information OUTPHASE, and a phase sequence (c) indicates another example of the information OUTPHASE.

Figure 3:
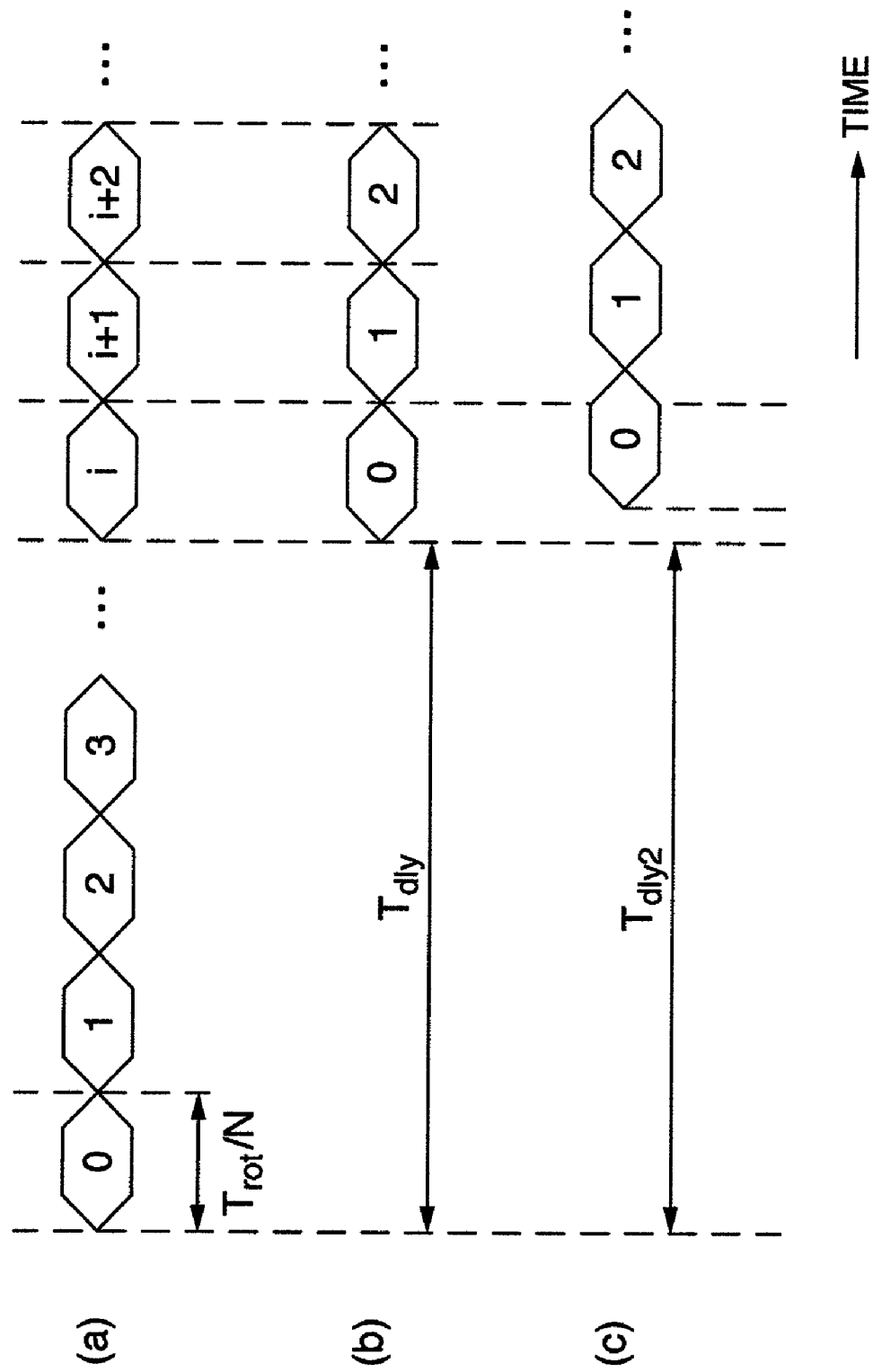
FIG. 3 is a timing chart for explaining an operation of a delay circuit in the first embodiment of the invention.

The timing chart (a) in FIG. 3 shows a configuration indicating that adding the predetermined value ("i" in the timing chart) to the information ROTPHASE is set to the information OUTPHASE. That is, a value obtained from adding the predetermined value to the information ROTPHASE stored in the flash memory etc. may be stored as the information OUTPHASE if the tracking servo system in this embodiment is realized by the digital servo, which is realized by a simple configuration. In this way, the delay time period in the delay circuit 203 can be adjusted with an accuracy of $T_{rot}/N$ which is an update period of the information ROTPHASE.

The phase sequence (c) in FIG. 3 will be described as another example. In the case of the phase sequence (b), the delay time period in the delay circuit 203 is adjusted with the accuracy of $T_{rot}/N$, however, it is not required to use with the accuracy of $T_{rot}/N$. In the case of another example in the phase sequence (c), a delay time period $T_{dly2}$ in the delay circuit 203 is adjusted with an accuracy of time period shorter than $T_{rot}/N$.

Figure 4:
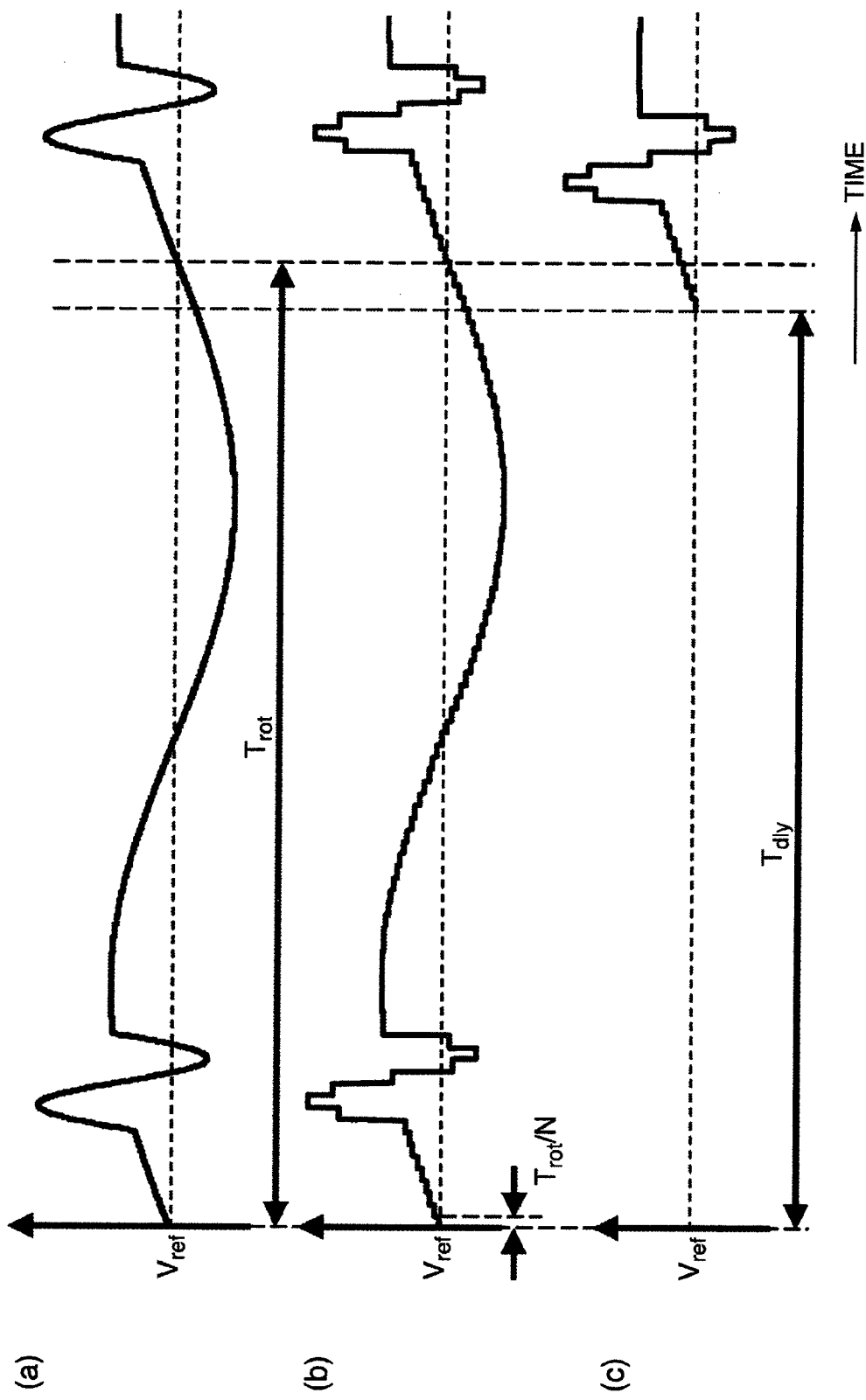
FIG. 4 is a waveform diagram for explaining the delay memory circuit in the first embodiment of the invention.

Next, an operation of the delay memory circuit 111 will be described with reference to a waveform diagram in FIG. 4. FIG. 4 indicates signal waveforms at respective portions of the delay memory circuit 111, in which $V_{ref}$ is a reference level of the tracking error signal. A waveform (a) is an output signal waveform of the low-pass filter 110. A waveform (b) indicates equivalently a signal stored in the memory circuit 201. A waveform (c) indicates an output signal waveform of the delay memory circuit 111.

As is apparent from FIG. 4, a value of an input signal is stored for a time interval $T_{rot}/N$ on the basis of the information ROTPHASE, and the stored value is output from there after elapsing the delay time period $T_{dly}$ in the delay circuit 203.

Here, the delay time period $T_{dly}$ delays the signal for a time period subtracted the delay time period in the low-pass filter 110 and the delay time period caused by a hold operation in the memory circuit 201 from one rotation period of the optical disk 101. In this way, a signal delay on propagation of the iterative learning control loop is corrected to then add the compensation signal REPOUT to the adder 106 at a timing when accurately elapsing one rotation period.

Figure 5:
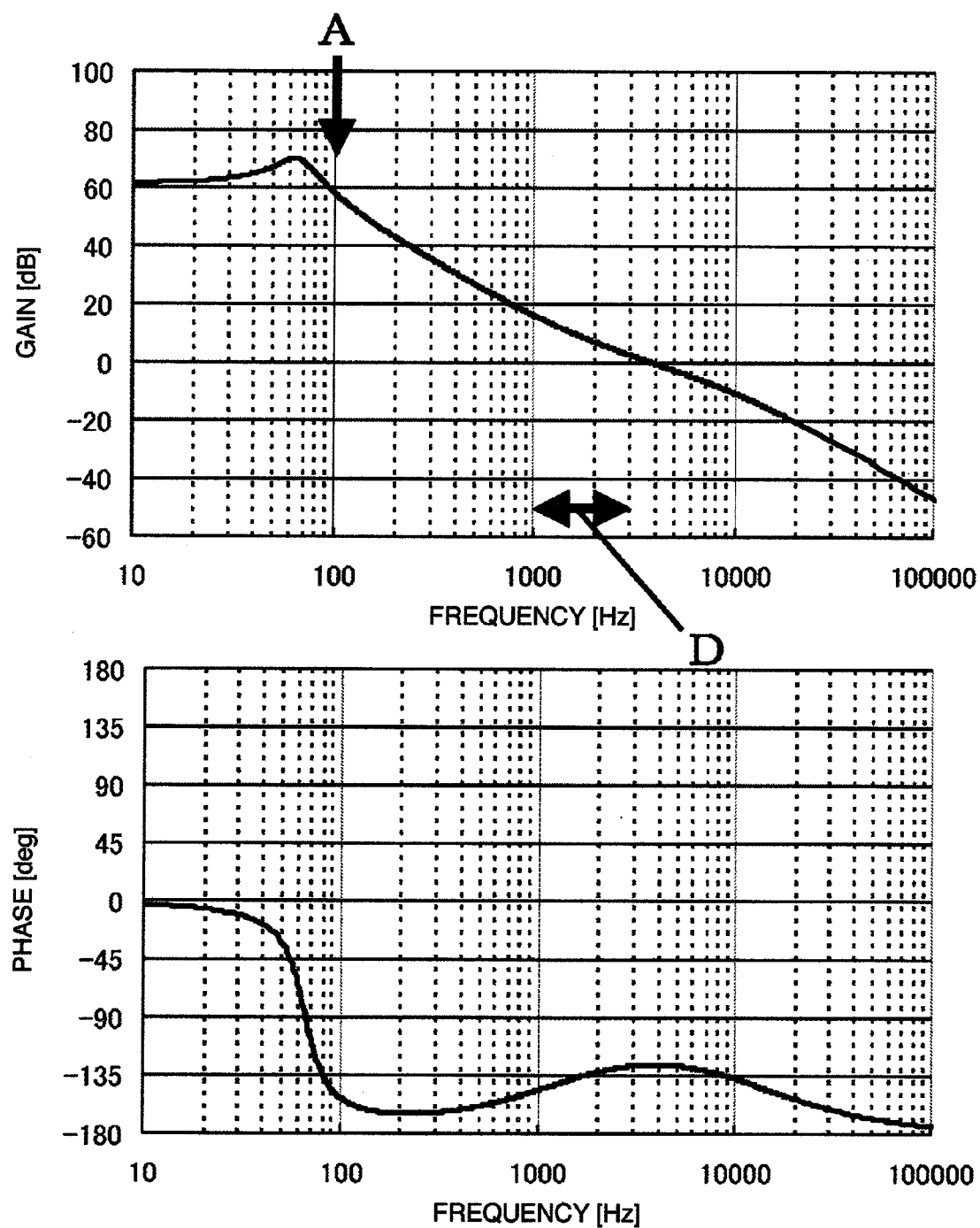
FIG. 5 is a Bode diagram of open-loop transfer function of a tracking servo in the first embodiment of the invention.

Here, FIG. 5 is a Bode diagram showing an open loop transfer function in relation to the tracking servo when the iterative learning control is not performed. Referring to FIG. 5, a frequency indicated by a character A is a rotation frequency. The rotation frequency is set to 100 Hz in this embodiment, as an example. A frequency range indicated by a character D indicates a frequency range in which a deviation is present. This embodiment will be discussed with the iterative learning control system having a suppression effect in the frequency range indicated by the character D.

In this embodiment, a total number N of the memory circuit 201 configuring the delay memory circuit 111 is set to a large number such that a shape of the deviation component in frequencies contained in the frequency range indicated by the character D in FIG. 5 can be stored therein.

Figure 6:
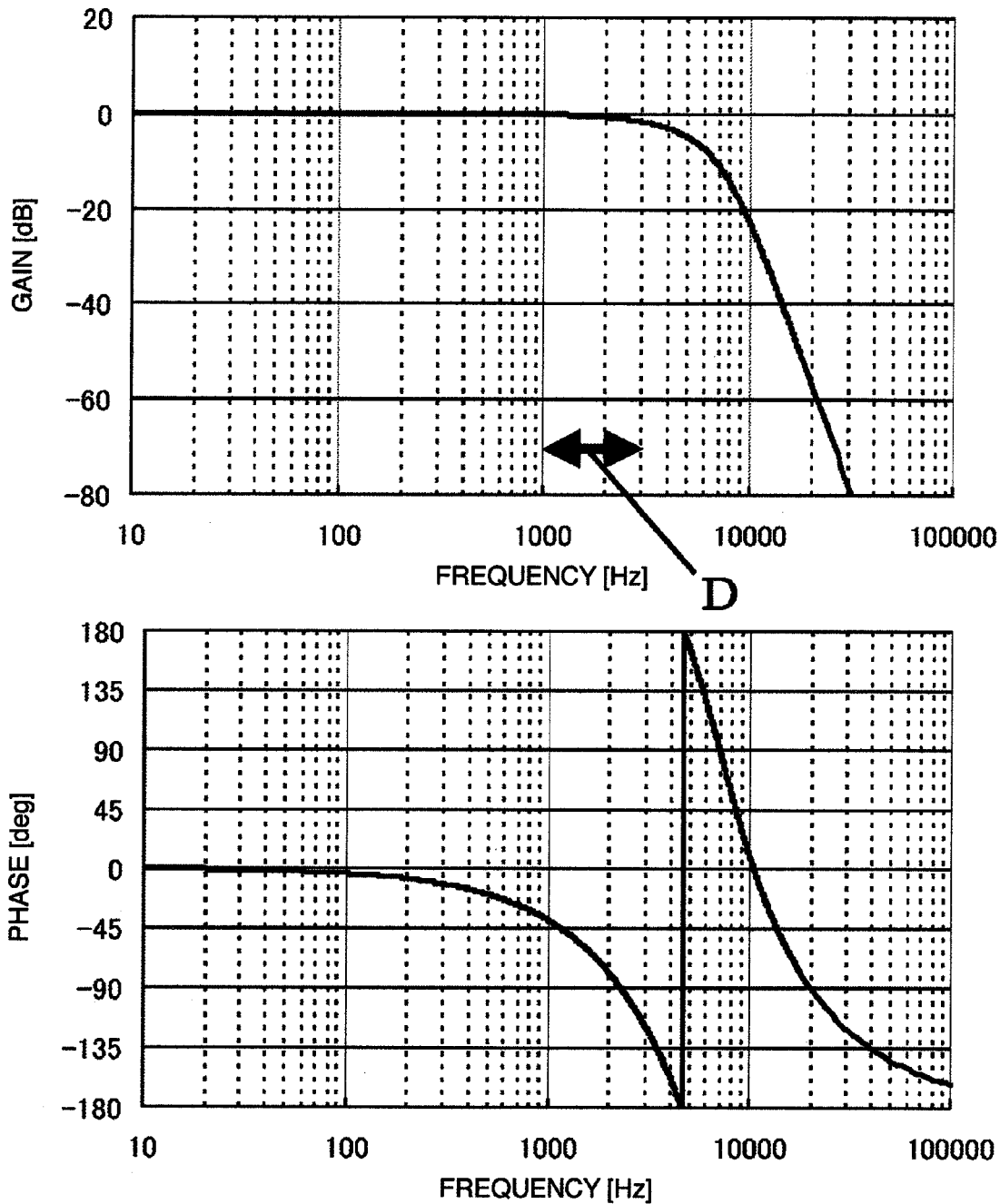
FIG. 6 is the Bode diagram of a low-pass filter in the first embodiment of the invention.

FIG. 6 shows the Bode diagram of the low-pass filter 110, as an example. A low-pass gain of the low-pass filter 110 is set to 0 dB, and a cutoff frequency is set to an upper limit frequency in the frequency range D. In this way, since the signal component of frequencies contained in the frequency range D passes through without attenuation, the compensation signal REPOUT generated by the iterative learning control is output against the disturbance component contained in the frequency range D. In contrast, since the signal component of frequencies beyond the upper limit frequency in the frequency range D is attenuated, the compensation signal REPOUT is not output against the disturbance component of high frequency.

Further, a phase characteristic of the low-pass filter 110 has a linear-phase characteristic in a pass band. This is because the delay time at a time of passing through the low-pass filter 110 becomes constant in the frequency range D and the iterative learning control performance can be enhanced.

Figure 7:
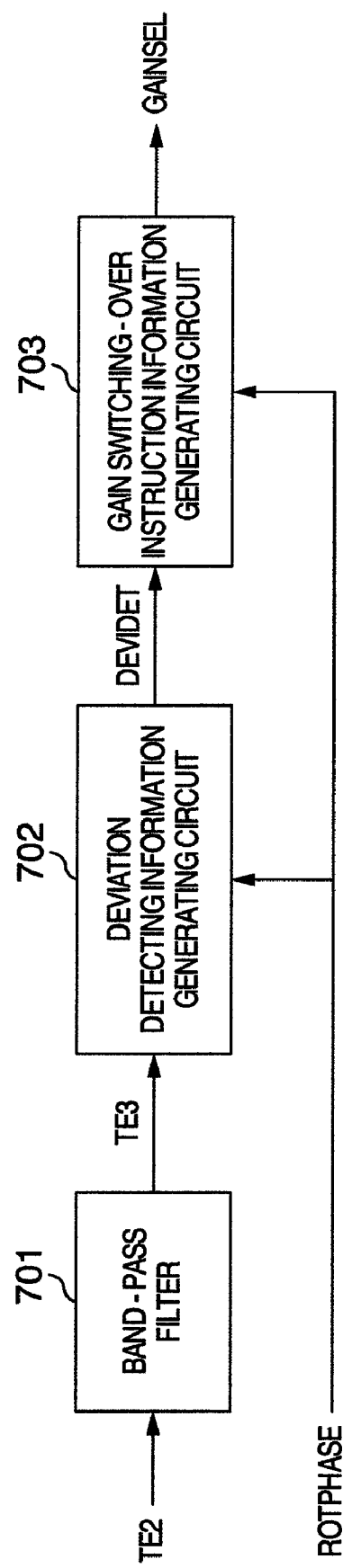
FIG. 7 is a configuration diagram showing a deviation detecting circuit in the first embodiment of the invention.

Next, the configuration of deviation detecting circuit 113 in this embodiment will be described with reference to FIG. 7.

A reference numeral 701 denotes a band-pass filter which attenuates a rotation frequency component and its second and third components with respect to the signal TE2 as being an input signal of the deviation detecting circuit 113 to thereby output a signal TE3 from which a noise component of the high frequency was attenuated.

A numeral 702 denotes a deviation detecting information generating circuit which includes a timer therein and receives the signal TE3 and the information ROTPHASE to output deviation detected information DEVIDET indicating a range of the rotation phase at which the deviation is detected.

A numeral 703 denotes a gain switching-over instruction information generating circuit which generates the information GAINSEL for instructing a switching-over the value K of the variable gain device 112 on the basis of the information DEVIDET and the information ROTPHASE to then output it from there.

Figure 8:
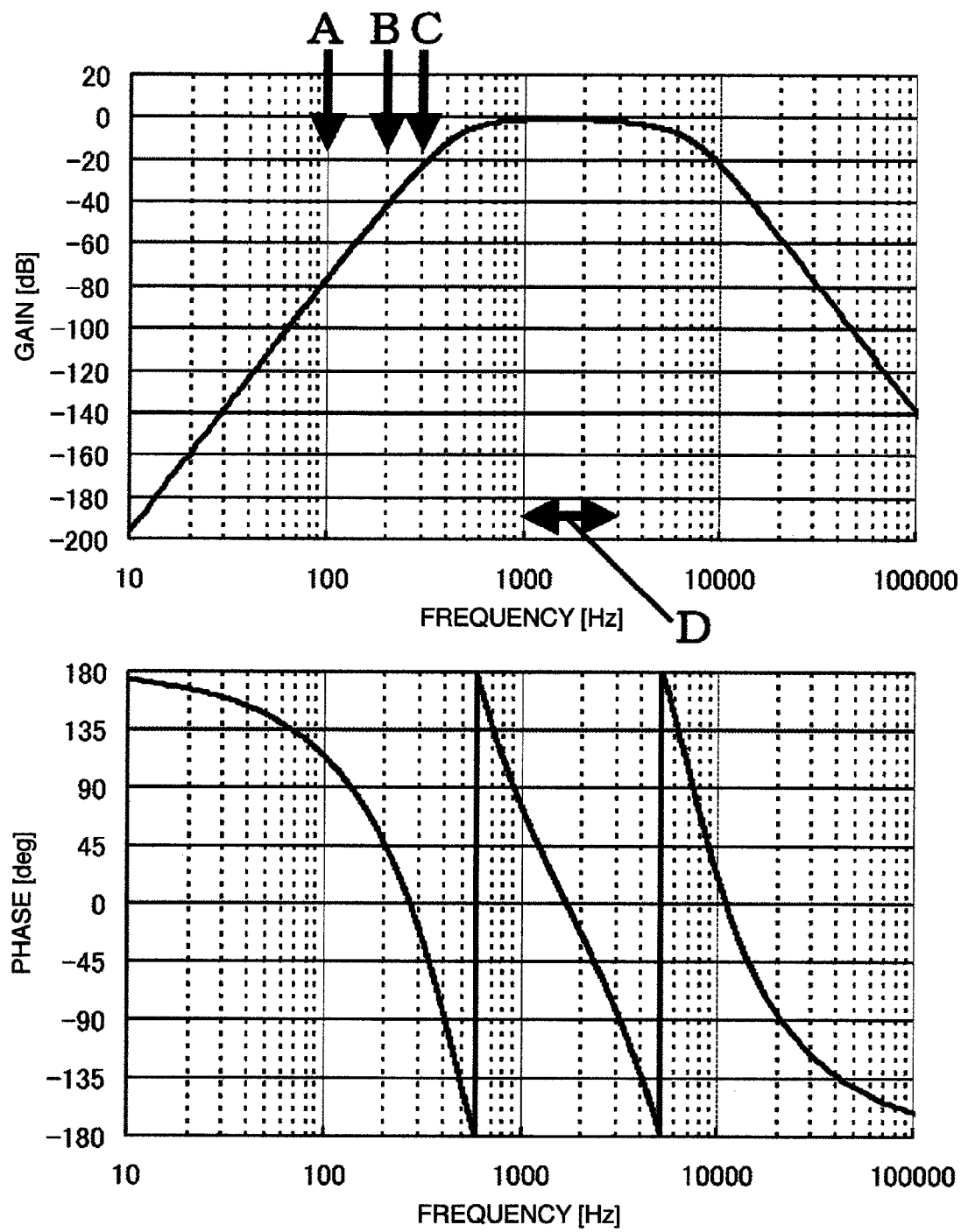
FIG. 8 is the Bode diagram of a band-pass filter in the first embodiment of the invention.

FIG. 8 shows a frequency characteristic of the band-pass filter 701, as an example. A character A in FIG. 8 indicates the rotation frequency. A character B indicates a frequency twice the rotation frequency. A character C indicates a frequency three times the rotation frequency. A frequency range D also indicates a frequency range in which the deviation is present.

In the gain characteristic of band-pass filter 701, the frequency range D is contained in a pass band, and the frequencies A, B and C are contained in an attenuation band. Therefore, the rotation frequency component and its second and third components caused by the eccentricity are attenuated. Further, the gain characteristic of band-pass filter 701 is set to a characteristic which attenuates them at beyond the upper frequency of the frequency range D. In this way, it is possible to also attenuate the noise component of high frequency at which the compensation signal REPOUT caused by the iterative learning control is not output due to the attenuation in the low-pass filter 110.

An advantageous effect of the band-pass filter 701 will be described with reference to waveforms shown in FIG. 9. A waveform (a) in FIG. 9 indicates the signal TE2, and a waveform (b) indicates the signal TE3. A character A in the waveform (a) indicates the deviation, and a waveform B indicates the noise component of high frequency.

Figure 9:
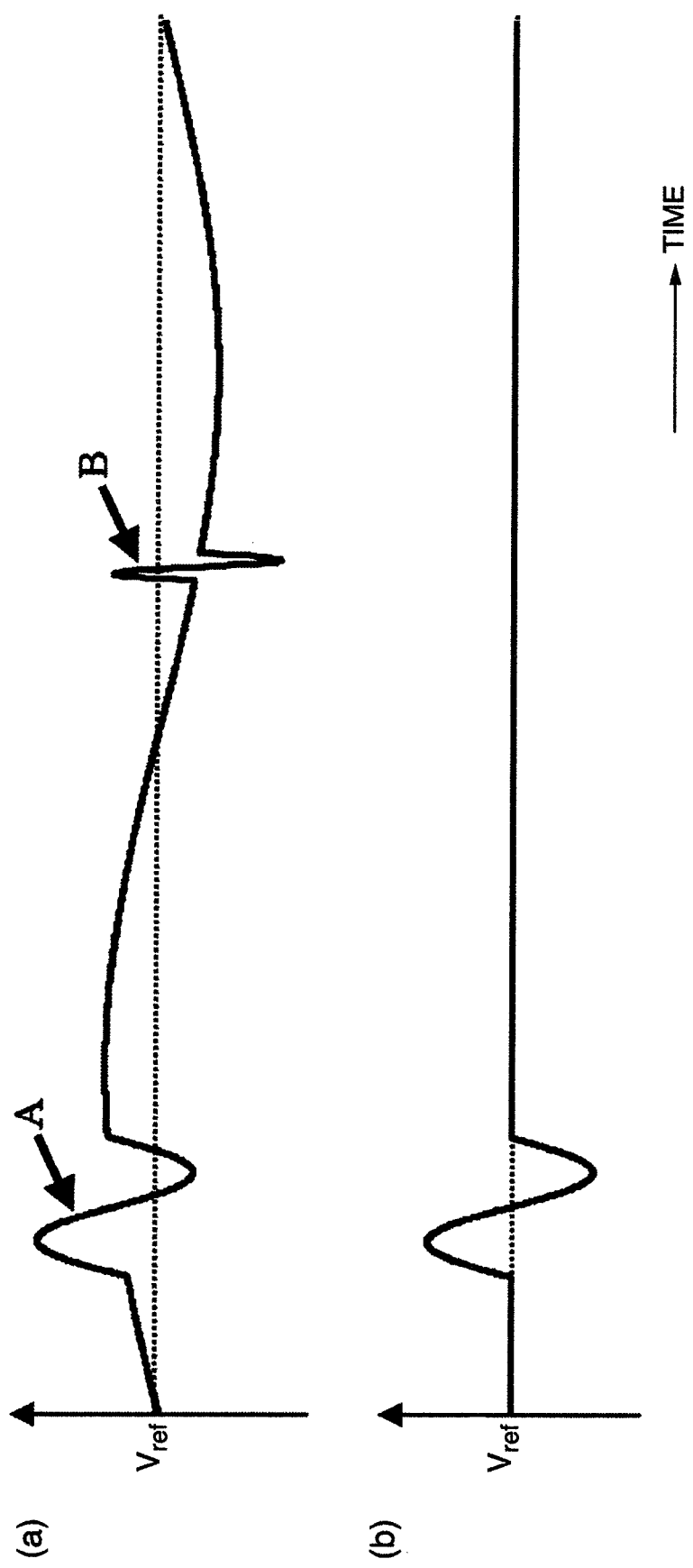
FIG. 9 is a waveform diagram for explaining the band-pass filter in the first embodiment of the invention.

By passing the frequency through the band-pass filter 701, the rotation frequency component and the noise component of high frequency caused by the eccentricity are attenuated in the case of the signal TE3 shown in the waveform (b) in FIG. 9. That is, the signal TE3 becomes a signal which contains the deviation component alone extracted from the signal TE2.

Figure 10:
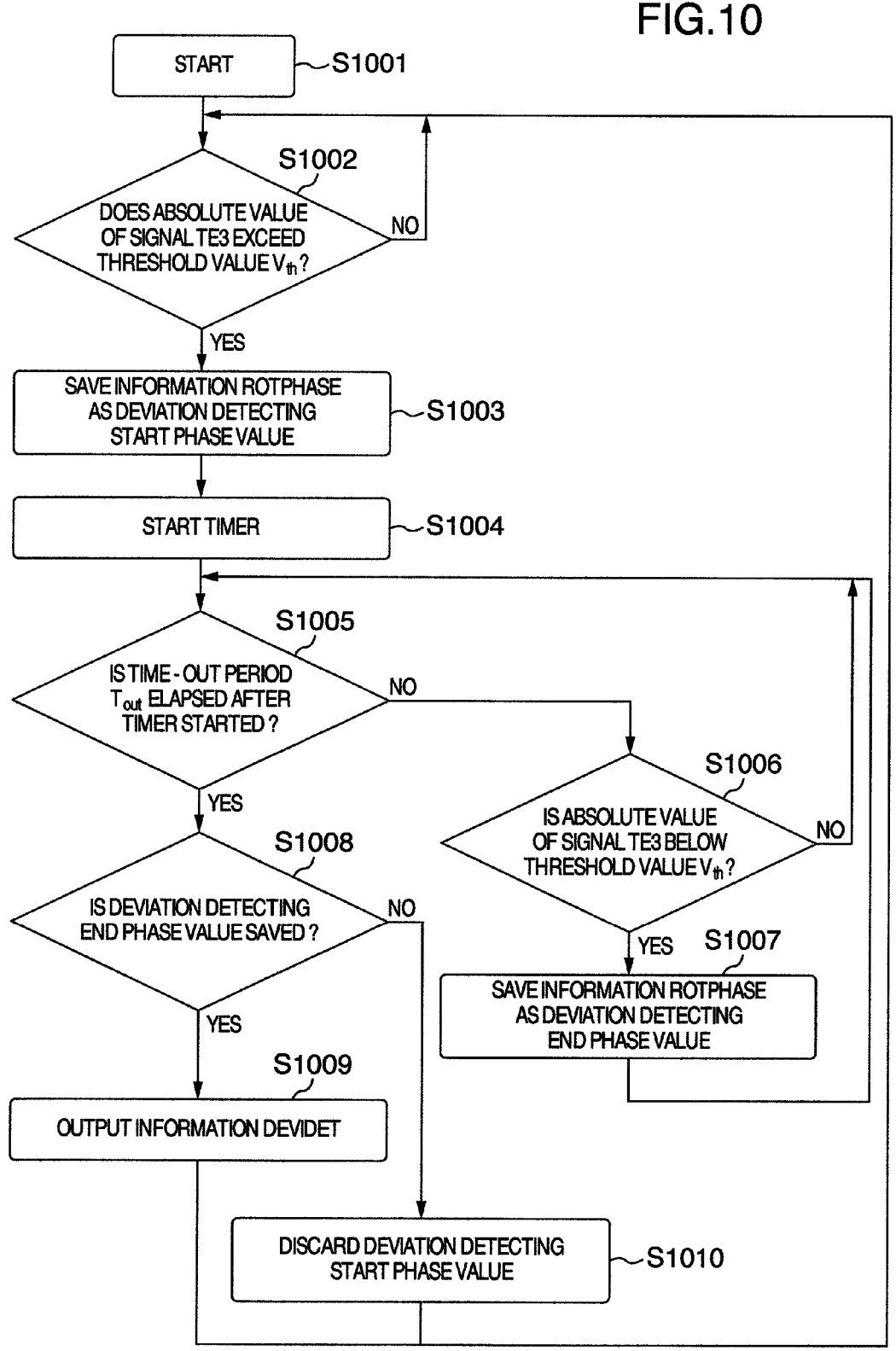
FIG. 10 is a flowchart for explaining an operation of the deviation detecting information generating circuit in the first embodiment of the invention.

Next, an operation of the deviation detecting information generating circuit 702 will be described with reference to a flowchart in FIG. 10.

The deviation detecting information generating circuit 702 starts an operation at step S1001, and monitors an absolute value of the signal TE3 to detect whether the absolute value of signal TE3 exceeds a threshold value $V_{th}$ at step S1002. If the absolute value of signal TE3 does not exceed the threshold value $V_{th}$ (in the case of "No" at the step S1002), the process returns to the step S1002.

If the absolute value of signal TE3 exceeds the threshold value $V_{th}$ (in the case of "Yes" at the step S1002), a rotation phase at this time point is obtained from the information ROTPHASE to be stored as a deviation detecting start phase value at step S1003. Subsequently, the timer starts, and a time period is measured after the absolute value of signal TE3 exceeds the threshold value $V_{th}$ at step S1004.

Next, the process determines whether a time-out period $T_{out}$ is elapsed after the timer started, at step S1005.

If the time-out period $T_{out}$ is not elapsed after the timer started (in the case of "No" at the step S1005), a detection is performed whether the absolute value of signal TE3 is below the threshold value $V_{th}$ at step S1006. If the absolute value of signal TE3 is not below the threshold value $V_{th}$ (in the case of "No" at the step S1006), the process returns to the step S1005.

If the absolute value of signal TE3 is below the threshold value $V_{th}$ (in the case of "Yes" at the step S1006), the rotation phase at this time point is obtained from the information ROTPHASE to be stored as a deviation detecting end phase value at step S1007. At this time, the deviation detecting end phase value is overwritten, even though the deviation detecting end phase value has already been saved. According to the above-mentioned operation, when a time period, during which the absolute value of signal TE3 exceeds the threshold values $V_{th}$ in plural times, is present in the time-out period $T_{out}$, the plural time periods are determined as one deviation. After processing at the step S1007, the process returns to the step S1005.

If the time-out period $T_{out}$ is elapsed after the timer started (in the case of "Yes" at the step S1005), the process determines whether the deviation detecting end phase value is already saved at step S1008.

If the deviation detecting end phase value has already been saved (in the case of "Yes" at the step S1008), the process decides that a single deviation is present in the time period from the deviation detecting start phase value to the deviation detecting end phase value, and the information DEVIDET is generated and output at step S1009. The process then returns to the step S1002.

Here, the following description will be concerned with the generation of information DEVIDET output at the step S1009. When the deviation detecting start phase value is set to "M" and the deviation detecting end phase value is set to "N", it is assumed that the information DEVIDET indicates a range of the rotation phase added a predetermined rotation phase to a leading and trailing portions of the time period from the rotation phase "M" to the rotation phase "N". For example, when a range of the predetermined rotation phase is 1, the information DEVIDET indicates a range from M−1 to N+1.

On the other hand, if the time-out period $T_{out}$ is elapsed after the timer started, in a condition where the deviation detecting end phase value is not saved (in the case of "No" at the step S1008), the deviation detecting start phase value, which is already stored, is discarded at step S1010. The process then returns to the step S1002.

Figure 11A:
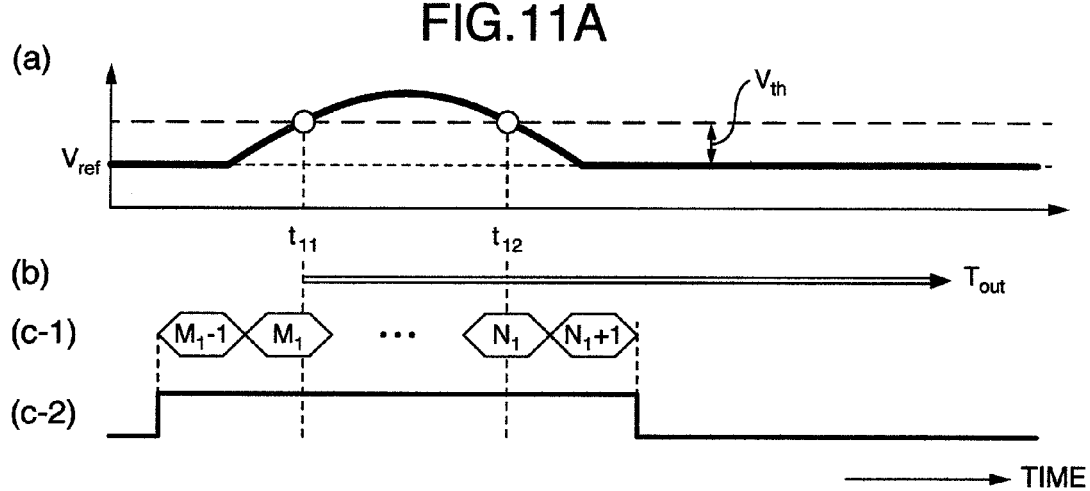
FIGS. 11A, 11B and 11C are waveform diagrams for explaining the deviation detecting information generating circuit in the first embodiment of the invention.
Figure 11B:
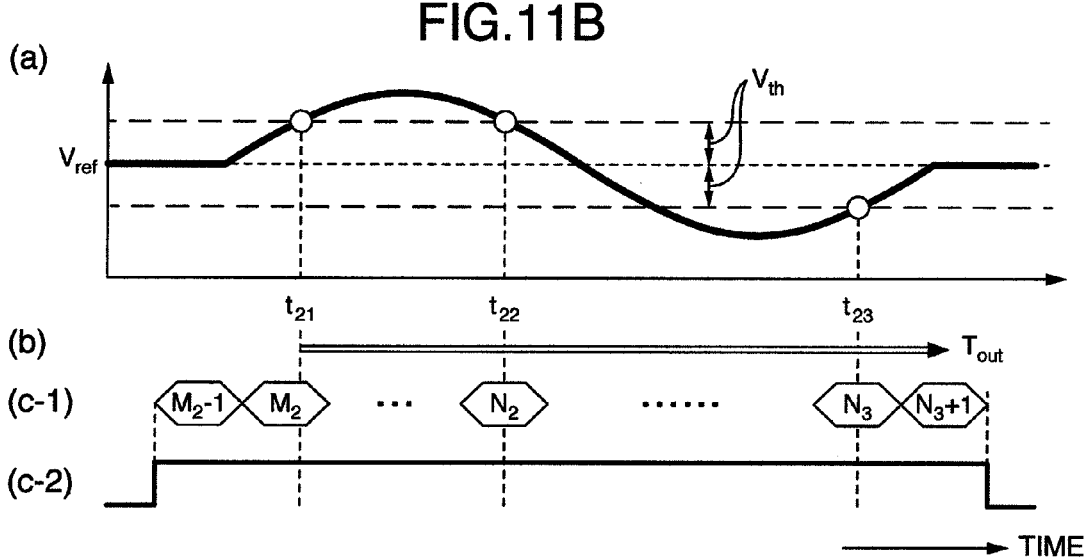
Figure 11C:
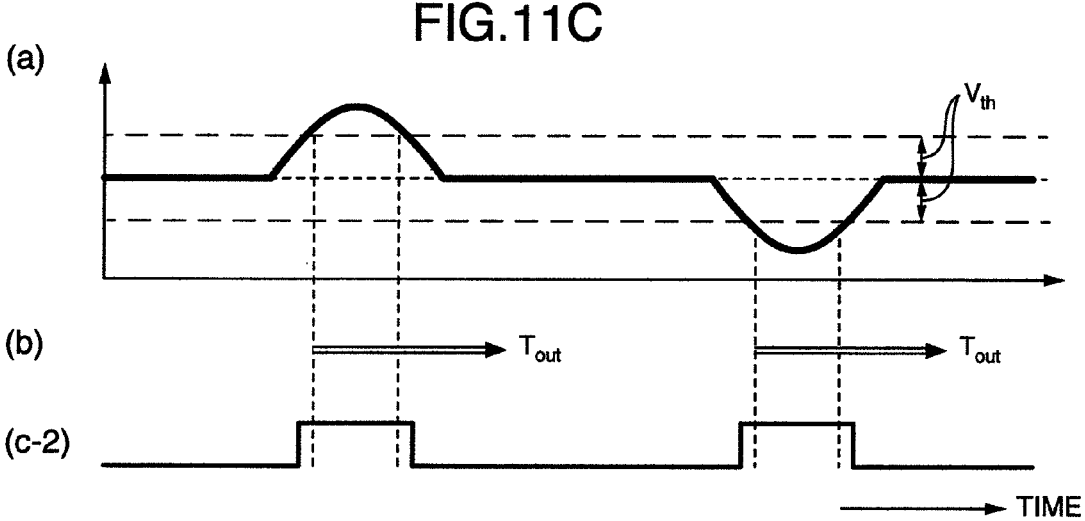

The following description will be concerned with a deviation detection in the deviation detecting information generating circuit 702 with reference to waveforms in FIGS. 11A, 11B and 11C. FIGS. 11A, 11B and 11C show respectively a deviation shape, as three types. FIG. 11A indicates a case where a single deviation waveform contained in the signal TE3 exceeds the threshold value $V_{th}$ at a positive side alone. FIG. 11B indicates a case where a single deviation waveform contained in the signal TE3 exceeds the threshold value $V_{th}$ at both the positive side and negative side. Further, FIG. 11C indicates a case where two deviations are present in one rotation period.

In FIGS. 11A, 11B and 11C, waveforms (a) indicate respectively the signal TE3. Arrows (b) indicate respectively a time period from when the timer starts measurement to when the time-out period $T_{out}$ is elapsed. Phase sequences (c-1) and waveforms (c-2) indicate respectively and schematically the information DEVIDET output from the deviation detecting information generating circuit 702 in which the phase sequence (c-1) is the information ROTPHASE and the waveform (c-2) is a signal which becomes a high level in the range of the information DEVIDET.

The following description will be concerned with the detection of deviation in FIG. 11A. The deviation detecting information generating circuit 702 starts the timer at a time $t_{11}$ when the absolute value of signal TE3 exceeds the threshold value $V_{th}$ to store a rotation phase $M_1$ at that time point as the deviation detecting start phase value. At a time $t_{12}$ when the absolute value of signal TE3 is below the threshold value $V_{th}$, a rotation phase $N_1$ at that time point is stored as the deviation detecting end phase value. After that, the time-out period $T_{out}$ is elapsed to thereby decide the time period from the time $t_{11}$ to the time $t_{12}$ as a time period during which the single deviation is present.

As is apparent from FIG. 11A, the time period from the time $t_{11}$ to the time $t_{12}$ is a time period during which the absolute value of signal TE3 exceeds the threshold value $V_{th}$, but the leading and trailing portions of the deviation waveform (a time period during which the absolute value of signal TE3 does not exceed the threshold value $V_{th}$) are not contained therein. For this reason, a range indicated by the information DEVIDET is set to a range of the rotation phase added a predetermined rotation phase to the leading and trailing portions of the time period from the rotation phase $M_1$ to the rotation phase $N_1$. FIG. 11A shows an example that outputs the information DEVIDET by adding one rotation phase to the leading and trailing portions of the time period from the rotation phase $M_1$ to the rotation phase $N_1$. In the case of FIG. 11A, the information DEVIDET indicating the range from the rotation phase $M_1-1$ to rotation phase $N_1+1$ is output, that is, it is meant that the deviation is detected in this range.

The following description will be concerned with a case where that absolute value of signal TE3 exceeds the threshold value $V_{th}$ at both the positive and negative sides as shown in FIG. 11B. The timer starts at a time $t_{21}$ when the absolute value of signal TE3 exceeds the threshold value $V_{th}$, and a rotation phase $M_2$ at that time point is stored as the deviation detecting start phase value. After that, the absolute value of signal TE3 is below the threshold value $V_{th}$ at a time $t_{22}$, and a rotation phase $N_2$ at that time point is stored as the deviation detecting end phase value. However, in the case of the deviation waveform in FIG. 11B, since the absolute value of signal TE3 is again below the threshold value $V_{th}$ at a time $t_{23}$ before the time-out period $T_{out}$ is elapsed, the deviation detecting end phase value is overwritten on a rotation phase $N_3$ at the time $t_{23}$. After that, the time-out period $T_{out}$ is elapsed to thereby decide a time period from the time $t_{21}$ to time $t_{23}$ as a time period during which the single deviation is present. In consequence, the information DEVIDET indicating the range from a rotation phase $M_2-1$ to a rotation phase $N_3+1$ is output in the case of FIG. 11B.

The following description will be concerned with a case where two deviations are present in one rotation period in FIG. 11C. In addition, the phase sequence (c-1) is omitted in FIG. 11C. Assuming that the apparatus is configured such that the time-out period $T_{out}$ is not provided, the two deviations are determined as a single deviation. However, the time-out period $T_{out}$ is provided to be able to detect the two deviations separately.

Next, the gain switching-over instruction information generating circuit 703 will be described in this embodiment.

The gain switching-over instruction information generating circuit 703 receives the information DEVIDET and the information ROTPHASE output from the deviation detecting information generating circuit 702 to then store the information DEVIDET of an immediately preceding one rotation amount. Further, the gain switching-over instruction information generating circuit 703 generates the GAINSEL on the basis of the information DEVIDET, which was stored at the immediately preceding one rotation, output from the deviation detecting information generating circuit 702. The gain switching-over instruction information generating circuit 703 also obtains the rotation phase from the information ROTPHASE to output the information GAINSEL at a timing when a predetermined rotation phase comes to.

The following description will be concerned with the gain switching-over instruction information GAINSEL to be output. The information GAINSEL is output for instructing such that the value of variable gain device 112 is set to 1 in the rotation phase range indicated by the information DEVIDET, which was stored at the immediately preceding one rotation, output from the deviation detecting circuit 702.

Further, at the rotation phase other than the above-mentioned rotation phase (the deviation is not detected), the information GAINSEL is output for instructing such that the value of variable gain device 112 is set to 0.5.

Figure 12:
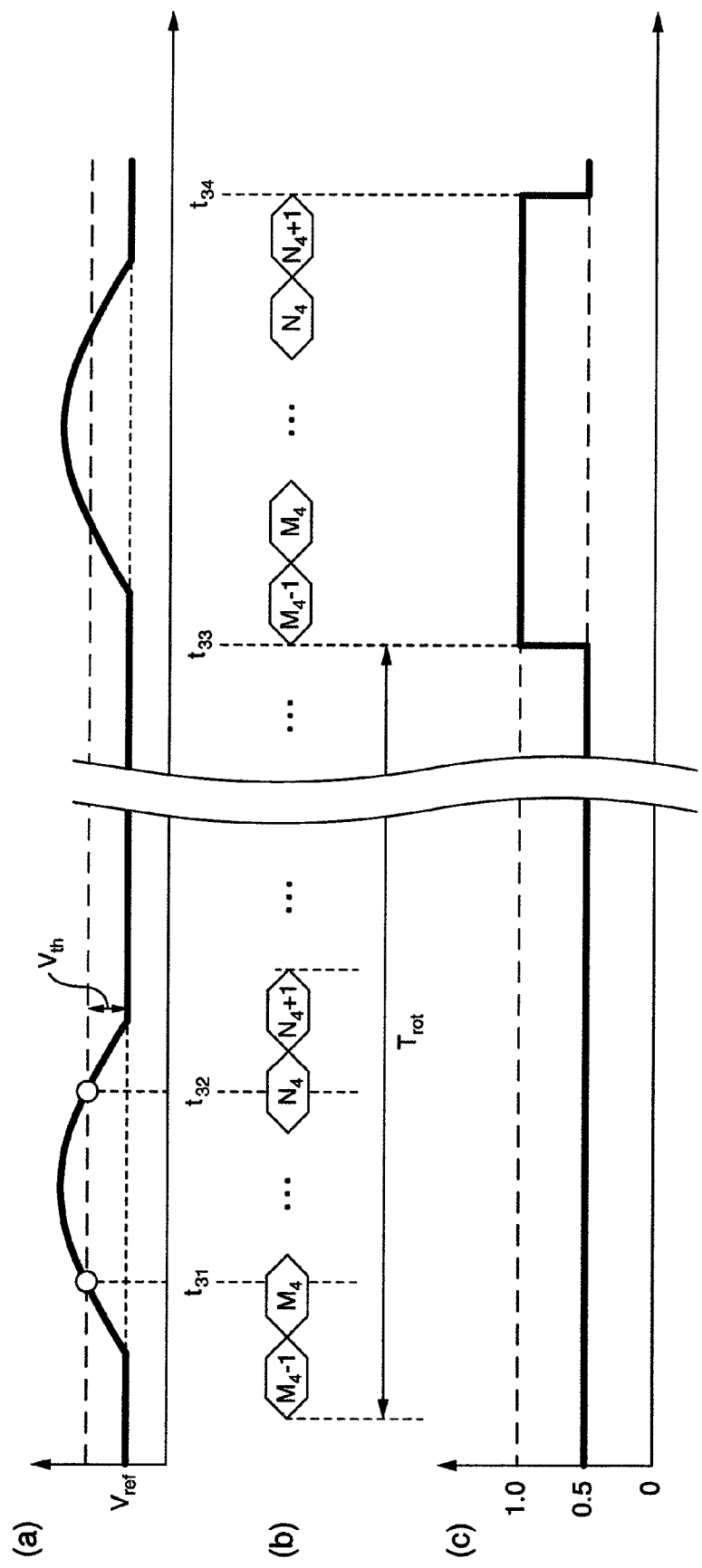
FIG. 12 is a waveform diagram for explaining a gain switching-over instruction information generating circuit in the first embodiment of the invention.

FIG. 12 is a diagram showing an example of waveforms at respective portions of the gain switching-over instruction information generating circuit 703. A waveform (a) in FIG. 12 indicates the signal TE3. A phase sequence (b) indicates the rotation phase information ROTPHASE. A waveform (c) indicates the value K of variable gain device 112 instructed by the information GAINSEL.

In FIG. 12, the deviation is detected at a time $t_{31}$ to a time $t_{32}$ by the deviation detecting information generating circuit 702 to thereby output the information DEVIDET indicating a range from a rotation phase $M_4-1$ to a rotation phase $N_4+1$. The gain switching-over instruction information generating circuit 703 outputs the information GAINSEL which instructs so as to set the value of variable gain device 112 to 1 at a time $t_{33}$ at which the rotation phase becomes $M_4-1$. After that, the gain switching-over instruction information generating circuit 703 outputs the information GAINSEL which instructs so as to return the value of variable gain device 112 to 0.5 at a time $t_{34}$ at which the rotation phase becomes $N_4+1$.

According to the above-mentioned operation, the value of variable gain device 112 is increased in the rotation phase range in which the deviation is detected at the immediately preceding one rotation.

The following description will be concerned with an advantageous effect caused by increasing the value of variable gain device 112 in the rotation phase range in which the deviation is detected, with reference to a Bode diagram.

FIGS. 13A to 13D show respectively the Bode diagram as a single iterative learning control. FIG. 13A is the Bode diagram for a case applicable to the iterative learning control in which the value of variable gain device 112 is set to K=1. FIG. 13B is the Bode diagram for a case applicable to the iterative learning control in which the value of variable gain device 112 is set to K=0.5.

The Bode diagram in the single iterative learning control has a comb-shaped characteristic in which the gain becomes a peak at an integral multiple of the rotation frequency. Further, the gain becomes negative at a frequency of an odd multiple of 0.5, such as 1.5 or 2.5 times the rotation frequency. The gain G [dB] at the frequency of the odd multiple of 0.5 at the rotation frequency can be represented by the following expression (2) with use of the value K of variable gain device 112.

$$G=20 \text{ Log}(1+K) \quad (2)$$

That is, a gain depression in the case of K=1 is −6 dB (gain value indicated by A in FIG. 13A). The gain depression in the case of K=0.5 is −3.52 dB (gain value indicated by B in FIG. 13B).

Figure 14A:
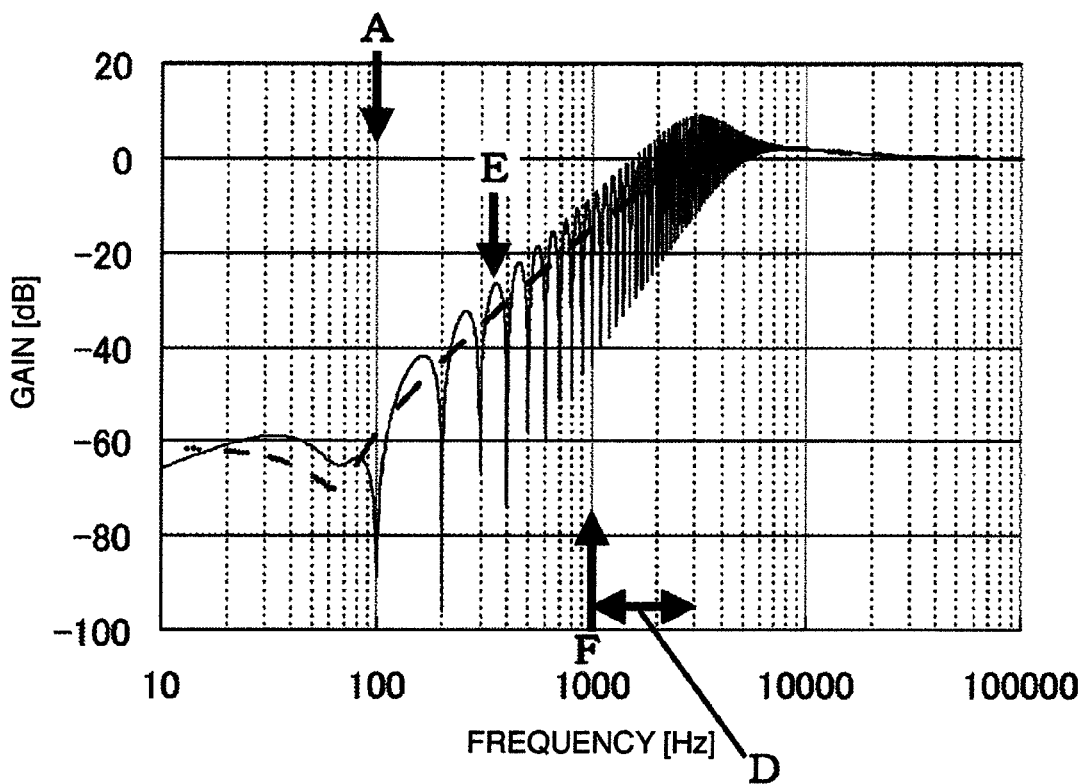
FIGS. 14A and 14B are gain characteristic diagrams of a sensitivity function of the tracking servo in the first embodiment of the invention.
Figure 14B:
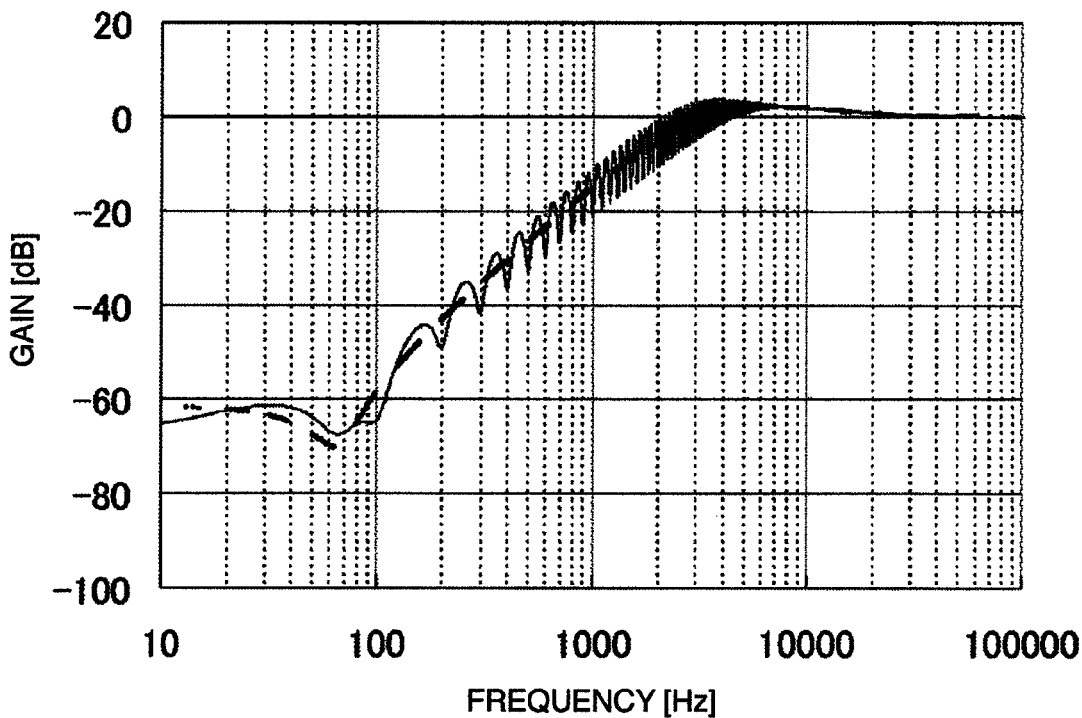

Generally, it has been known that the suppression degree against the disturbance component to be added to the servo system is represented by the gain of sensitivity function. FIGS. 14A and 14B show respectively the gain characteristic of sensitivity function in relation to the tracking servo in this embodiment. That is, it is meant that the smaller the gain of sensitivity, the larger the suppression effect becomes.

FIG. 14A indicates the gain characteristic of sensitivity function in a case applicable to the iterative learning control in which the value of variable gain device 112 is set to K=1. FIG. 14B indicates the gain characteristic of sensitivity function in a case applicable to the iterative learning control in which the value of variable gain device 112 is set to K=0.5. In addition, the broken lines in FIGS. 14A and 14B indicate the gain characteristic of sensitivity function in a case where the iterative learning control does is not used.

In FIG. 14A, a frequency indicated by A is the rotation frequency, and the frequency range indicated by D is a frequency range in which the deviation is present. Further, the frequency indicated by E indicates a frequency of 3.5 times the rotation frequency as an example of the frequency which has the odd multiple of 0.5 of the rotation frequency. The frequency indicated by F indicates a frequency ten times the rotation frequency as an example of the frequency which has the integer multiple of the rotation frequency.

As is apparent from FIGS. 14A and 14B, the gain of sensitivity function in the case of using the iterative learning control turns down steeply at the frequency of the integer multiple of the rotation frequency as the frequency indicated by F and also turns down in comparison with the case where the iterative learning control is not used. Further, the larger the value of K, the smaller the gain of sensitivity function becomes at the frequency of the integer multiple of the rotation frequency. For this reason, the suppression degree becomes maximum at K=1 in the case of considering the suppression for a rotation synchronous component, so that the suppression can be performed appropriately.

In contrast, in the case of the frequency which is not the integer multiple of the rotation frequency as the frequency indicated by E and is not synchronized with the rotation, the frequency range, in which the gain of sensitivity function is increased, is present in comparison with the case where the iterative learning control is not used. That is, a follow-up performance of the servo rather deteriorates by using the iterative learning control when entering the disturbance component other than the rotation frequency of the integer multiple into the tracking servo system. Further, the gain increase of sensitivity function becomes larger with increase of the value K. For this reason, the follow-up performance becomes worst at K=1 in the case of considering the follow-up performance deterioration caused by the rotation asynchronous component. This is because the larger the value K, the smaller the gain at the frequency which is odd multiple of 0.5 of the rotation frequency becomes. For example, a vibration occurred from using an optical disk apparatus as a vehicle-mounted device is thinkable when entering the rotation asynchronous component into the servo system.

For this reason, the known iterative learning control has used the value K smaller than 1, such as K=0.5, in light of an effect extent to the performance of optical disk apparatus in relation to a problem such that the suppression is short against the deviation and a problem such that the follow-up performance is deteriorated against the rotation asynchronous component.

However, as described above, there has been a demand that the follow-up performance deterioration for the rotation asynchronous component is kept remained about K=0.5 and the suppression degree for the deviation is further increased, in light of the case where an excellent follow-up performance is demanded rather than the specification ruled as a servo performance of the optical disk apparatus.

Figure 15A:
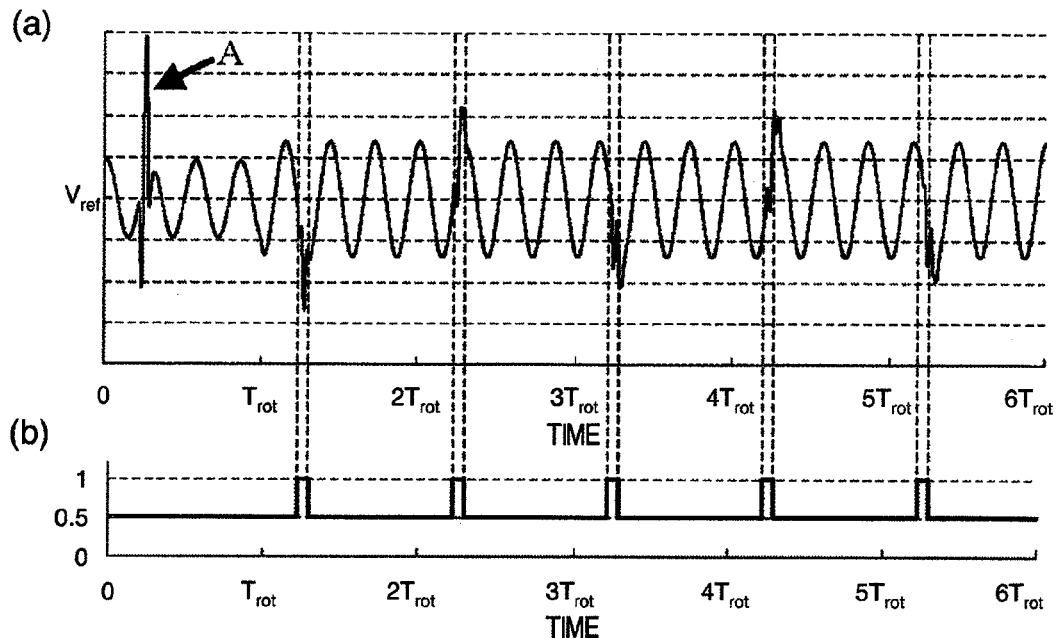
FIGS. 15A, 15B and 15C are waveform diagrams for explaining the first embodiment of the invention.
Figure 15B:
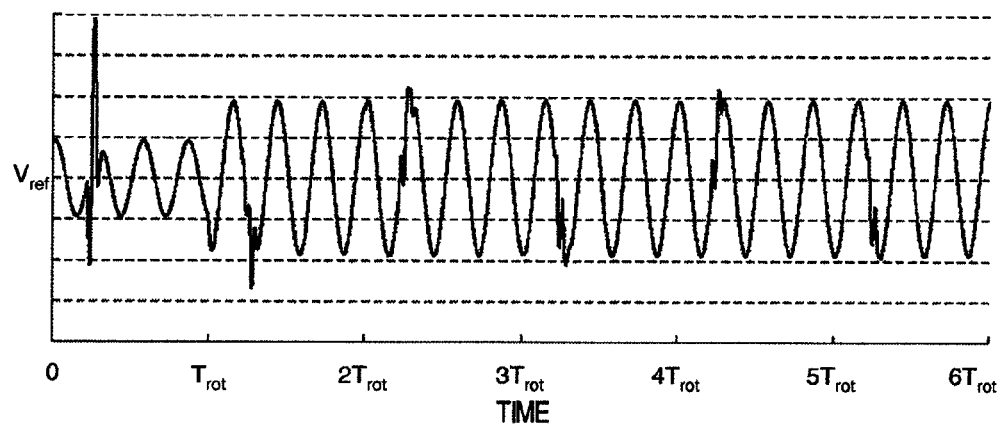
Figure 15C:
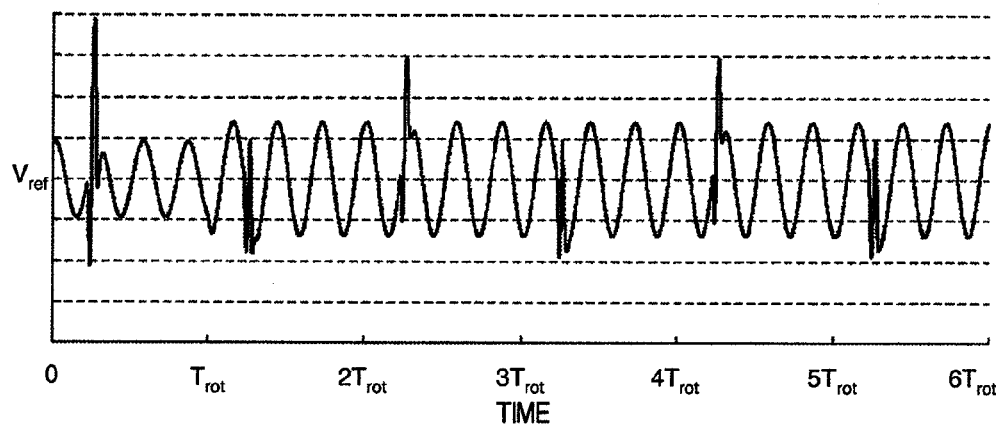

Consequently, the following description will be concerned with an advantageous effect of the optical disk apparatus in the configuration of this embodiment with reference to simulation waveforms. FIGS. 15A, 15B and 15C show simulation results in the case of assuming use of an optical disk having the deviation, in the optical disk apparatus to which the rotation asynchronous vibration is added steadily. A frequency of the rotation asynchronous vibration component is set to 3.5 times the rotation frequency, which corresponds to the frequency indicated by E in FIG. 14A. Further, the frequency of the deviation component is set to ten times the rotation frequency, which corresponds to the frequency indicated by F in FIG. 14A.

FIG. 15A shows a simulation result when using the optical disk apparatus in this embodiment. A waveform (a) indicates the signal TE1, and a waveform (b) indicates the value K of variable gain device 112. FIG. 15B indicates a signal TE when using the variable gain device 112 with a fixed value K=1. FIG. 15C indicates the signal TE when using the variable gain device 112 with the fixed value K=0.5. FIGS. 15B and 15C correspond to the iterative learning control of a related art in which an illustration for the value of variable gain device 112 is omitted since the value of variable gain device 112 is fixed.

Storing the signal in the memory circuit 201 starts from t=0 on a time axis in relation to all of the simulations shown in FIGS. 15A to 15C. The output of iterative learning control starts from a timing at $t=T_{rot}$ after one rotation period. Therefore, a waveform of the signal TE1 for a time period from t=0 to $t=T_{rot}$ indicates a waveform of the signal TE1 when the iterative learning control is not used.

First, the deviation component is paid attention. A portion indicated by A for the time period from t=0 to $t=T_{rot}$ is a waveform of the deviation component when the iterative learning control is not used. In contrast, it is appreciated that the deviation component is suppressed appropriately in FIGS. 15A and 15B. On the other hand, in the case of FIG. 15C where the value K=0.5, the suppression effect is present for the deviation component, but the suppression degree is small compared with the cases in FIGS. 15A and 15B, therefore, it is appreciated that an amplitude remaining in the signal TE1 is large.

Next, a rotation asynchronous vibration component is paid attention. In the cases of FIGS. 15A to 15C using the iterative learning control, an amplitude of the rotation asynchronous vibration component is amplified at $t=T_{rot}$ and subsequent times. Among them, the amplitude is maximum in the case of FIG. 15B when the value K=1. In contrast, the amplitude is remained small in FIGS. 15A and 15C, compared with the case in FIG. 15B, therefore, it is appreciated that the follow-up performance deterioration caused by the rotation asynchronous component is small.

In this way, there has been a problem that the suppression of deviation component is short when K=0.5 and the follow-up performance deterioration caused by the rotation asynchronous component is large when K=1, in the case of the iterative learning control using the related art.

When the steady vibration component is remained as shown in FIG. 15B, an information record or reproduction is performed such that a laser beam remains zigzagged through the center of track, therefore, there arises a possibility to adversely effect on the record or reproduction performance of information in the optical disk apparatus. For this reason, it is desirable that the steady vibration component is suppressed as small as possible.

The optical disk apparatus configured in this embodiment has the suppression degree equivalent to K=1 against the deviation component, and can also maintain the follow-up performance deterioration about K=0.5, caused by the rotation asynchronous component.

From the above-mentioned operation, the optical disk apparatus in the first embodiment can suppress the follow-up performance deterioration caused by the rotation asynchronous component while the suppression degree is turned up against the deviation component, so that the follow-up performance of the tracking servo can be enhanced.

Second Embodiment

A second embodiment will be described below.

The configuration of optical disk apparatus in this embodiment is common with that shown in FIG. 1.

In the first embodiment, the value of variable gain device 112 is varied in the rotation phase range indicated by the information DEVIDET. However, the server follow-up performance is possibly deteriorated at a timing when the value of variable gain device 112 is varied largely.

In the first embodiment, a variation [dB] at the time of varying the value of variable gain device 112 is represented by the following expression (3).

$$20 \text{Log}\left(\frac{1}{0.5}\right) \approx 6 \qquad (3)$$

For example, when an eccentricity component is present in the optical disk, the amplitude of compensation signal REPOUT for the eccentricity component varies twice in response to the value of variable gain device 112. Since rapidly varying the waveform of the compensation signal REPOUT causes the disturbance for the servo system, there is a possibility that the servo follow-up performance is deteriorated temporarily at the timing of varying the value of variable gain device 112.

In light of the above-mentioned problem, this embodiment is an example for enhancing the servo follow-up performance when varying the value of variable gain device 112.

The optical disk apparatus in this embodiment is different from the first embodiment in the operation of the gain switching-over instruction information generating circuit 703 configuring the deviation detecting circuit 113.

The gain switching-over instruction information generating circuit 703 in this embodiment receives the information DEVIDET and the information ROTPHASE to store the information DEVIDET of the immediately preceding one rotation amount. The circuit 703 also generates the information GAINSEL on the basis of the information DEVIDET stored at the immediately preceding one rotation. The circuit 703 then obtains the rotation phase from the information ROTPHASE to output the information GAINSEL at a timing when coming to a predetermined rotation phase.

Next, the following description will be concerned with the gain switching-over instruction information GAINSEL to be output. The circuit 703 outputs the information GAINSEL for instructing such that the value of variable gain device 112 is set to 1 in the rotation phase range indicated by the information DEVIDET stored at the immediately preceding one rotation.

In addition, the information GAINSEL is output for instructing such that the value of variable gain device 112 is set to 0.7 for a predetermined time period of the rotation phase at the leading and trailing portions of the rotation phase range indicated by the information DEVIDET.

Further, the information GAINSEL is output for instructing such that the value of variable gain device 112 is set to 0.5 in the rotation phase other than the above-mentioned one.

Figure 16:
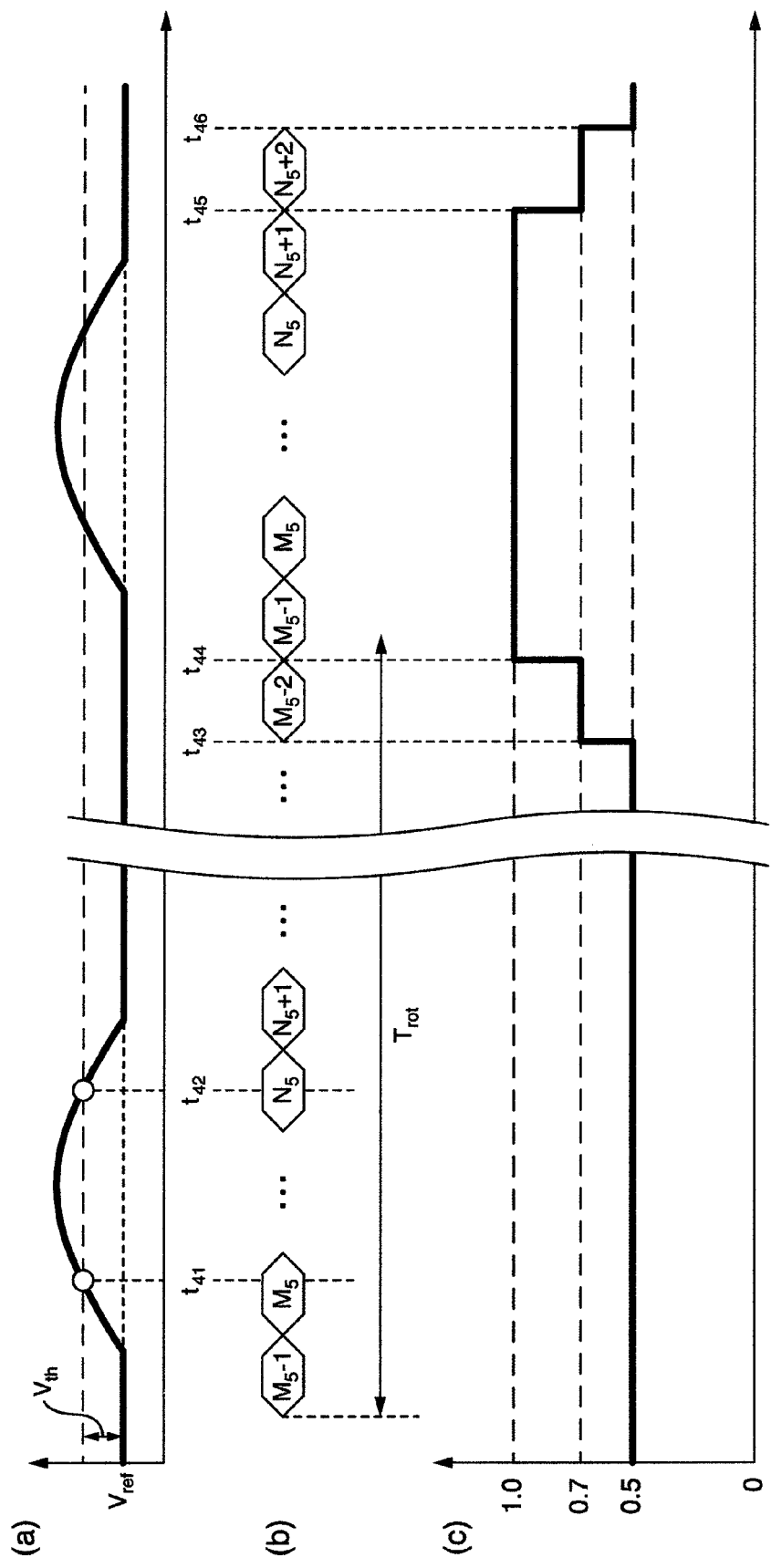
FIG. 16 is a waveform diagram for explaining the gain switching-over instruction information generating circuit in a second embodiment of the invention.

FIG. 16 is a diagram showing an example of waveforms at respective portions of the gain switching-over instruction information generating circuit 703. A waveform (a) in FIG. 16 indicates the signal TE3. A phase sequence (b) indicates the rotation phase information ROTPHASE. A waveform (c) indicates the value K of variable gain device 112 indicated by the information GAINSEL.

FIG. 16 indicates a case where the predetermined time period of rotation phase is one rotation phase. The deviation is detected at a time $t_{41}$ to a time $t_{42}$ by the circuit 702 to then output the information DEVIDET indicating a rotation phase $M_5-1$ to a rotation phase $N_5+1$. The circuit 703 outputs the information GAINSEL for instructing such that the value of variable gain device 112 is set to 0.7 at a time $t_{43}$ when the rotation phase becomes $M_5-2$, subsequently, the circuit 703 outputs the information GAINSEL for instructing such that the value of variable gain device 112 is set to 1 at a time $t_{44}$ when the rotation phase becomes $M_5-1$. After that, the circuit 703 outputs the information GAINSEL for instructing such that the value of variable gain device 112 is returned to 0.7 at a time $t_{45}$ when the rotation phase becomes $N_4+1$, and then outputs the information GAINSEL for instructing such that the value of variable gain device 112 is returned to 0.5 at a time $t_{46}$ when the rotation phase becomes $N_4+2$.

From the above-mentioned operation, the value of variable gain device 112 increases or decreases sequentially. In this embodiment, the variation amount [dB] at a time of varying the value of variable gain device 112 is represented by the following expression (4).

$$20 \text{Log}\left(\frac{0.7}{0.5}\right) \approx 20 \text{Log}\left(\frac{1}{0.7}\right) \approx 3 \qquad (4)$$

This variation amount is smaller than 6 dB in the case of the first embodiment. For this reason, the variation of waveform of the compensation signal REPOUT is also small, so that the disturbance added to the servo system can be made small when the value of variable gain device 112 is varied.

From the above-mentioned operation, the optical disk apparatus in the second embodiment can enhance the track follow-up performance of the tracking servo by varying the value of variable gain device 112 sequentially at the rotation phase of detecting the deviation.

Third Embodiment

A third embodiment in the invention will be described below.

The configuration of optical disk apparatus in this embodiment is common with that shown in FIG. 1.

The gain switching-over instruction information generating circuit 703 in the first embodiment has been configured to store the information DEVIDET of the immediately preceding one rotation amount. However, when the signal TE1 is varied by adding transiently an impact to the optical disk apparatus, the variation of signal TE1 caused by the impact is detected erroneously as a deviation, in the configuration of the first embodiment. In consequence, there is a possibility that the value of variable gain device 112 is increased.

In light of the above-mentioned problem, this embodiment is an example which does not detect erroneously the deviation when adding the impact to the optical disk.

The optical disk apparatus in this embodiment is different from that in the first embodiment in the operation of the circuit 703 configuring the deviation detecting circuit 113.

The circuit 703 in this embodiment receives the information DEVIDET and the information ROTPHASE output from the deviation detecting information generating circuit 702 to store the information DEVIDET of the immediately preceding two-rotation amount. Further, the circuit 703 generates the information GAINSEL on the basis of the information DEVIDET stored at the immediately preceding two rotations.

The circuit 703 also obtains the rotation phase from the information ROTPHASE to output the information GAINSEL at a timing when coming to a predetermined rotation phase.

Next, the following description will be concerned with the gain switching-over instruction information GAINSEL to be output. The circuit 703 outputs the information GAINSEL for instructing such that the value of variable gain device 112 is set to 1 in an overlapping rotation phase range among the rotation phase ranges indicating respectively, on the basis of, the information DEVIDET stored at two preceding rotations and the information DEVIDET stored at one preceding rotation.

Further, the circuit 703 outputs the information GAINSEL for instructing such that the value of variable gain device 112 is set to 0.5 in the rotation phase other than the above-mentioned one.

Figure 17:
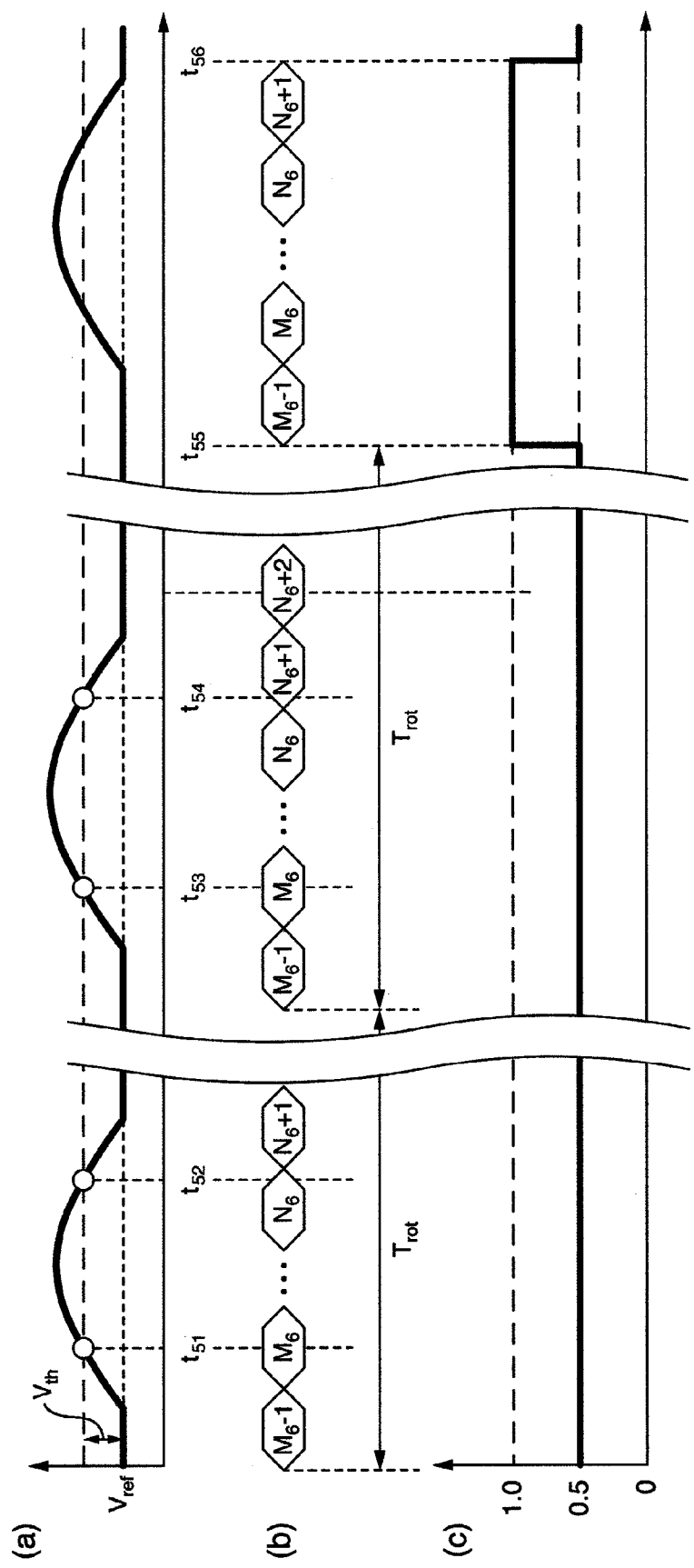
FIG. 17 is a waveform diagram for explaining the gain switching-over instruction information generating circuit in a third embodiment of the invention.
Figure 18:
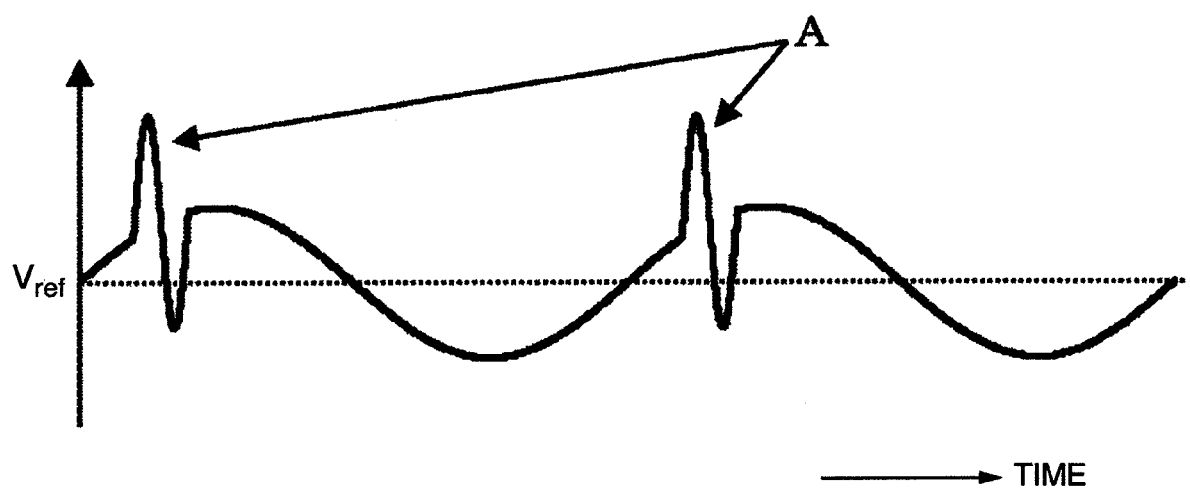
FIG. 18 is a waveform diagram for explaining a deviation component in a servo error signal.

FIG. 17 is a diagram showing an example of respective waveforms in relation to the gain switching-over instruction information generating circuit 703, in which a waveform (a) indicates the signal TE3, a phase sequence (b) indicates the rotation phase information ROTPHASE, and a waveform (c) indicates the value K of variable gain device 112 instructed by the information GAINSEL.

FIG. 17 indicates that the waveform of deviation component is varied at every rotation. First, the deviation detecting information generating circuit 702 detects the deviation at a time $t_{s1}$ to a time $t_{s2}$ to then output the information DEVIDET indicating the rotation phase $M_6-1$ to the rotation phase $N_6+1$.

Further, in the next rotation, the deviation is detected at a time $t_{s3}$ to a time $t_{s4}$. At this time, as shown in FIG. 7, the rotation phase at a time $t_{s4}$ is deviated by one rotation phase from the immediately preceding rotation to then make into $N_6+1$. This above case will be described below. That is, the information DEVIDET, indicating a range from the rotation phase $M_6-1$ to the rotation phase $N_6+2$, is output.

The circuit 703 stores the information DEVIDET of the two rotation amount to calculate the rotation phase range which is overlapped with another rotation phase range. In the case of FIG. 17, the overlapped rotation phase range becomes a range from the rotation range $M_6-1$ to the rotation phase $N_6+1$.

Therefore, the circuit 703 outputs the information GAINSEL for instructing such that the value variable gain device 112 is set to 1 at a time $t_{s5}$ when the rotation phase becomes $M_4-1$. After that, the circuit 703 outputs the information GAINSEL for instructing such that the value of variable gain device 112 is returned to 0.5 at a time $t_{s6}$ when the rotation phase becomes $N_4+1$.

When the impact is added to the optical disk apparatus, the signal TE3 is varied at the only rotation to which the impact was added. Therefore, as is apparent from FIG. 17, the value of variable gain device 112 is not increased even though adding the impact to the optical disk apparatus.

From the above-mentioned operation, the optical disk apparatus in the third embodiment avoids erroneously detecting the variation, as the deviation, of the signal TE1 caused by adding the impact thereto, so that it is possible to enhance the track follow-up performance of the tacking servo.

The range indicated by the information DEVIDET in the above-mentioned embodiments is set to a range of the rotation phase added the predetermined rotation phase to the leading and trailing portions for the time period from the deviation detecting start phase value to the deviation detecting end phase value. However, the range indicated by the information DEVIDET may be set from the deviation detecting start phase value to the deviation detecting end phase value, without adding the predetermined rotation phase.

The circuit 702 in the above-mentioned embodiments has a timer for determining such that plural time periods are equivalent to a single deviation, when the time period during which the signal TE3 exceeds the threshold value $V_{th}$ in plural times is present in the predetermined time-out period $T_{out}$. For this reason, since it is confirmed that the single deviation is present after the time-out period $T_{out}$ was elapsed, the circuit 702 stores the information DEVIDET of at least one rotation amount in advance, and the value of variable gain device 112 is varied first at the rotation after one rotation from the detection of deviation.

However, the circuit 702 may not have the timer, that is, the circuit 702 determines immediately that the deviation is detected at a time when the signal TE3 exceeds the threshold value $V_{th}$, and the value of variable gain device 112 is varied without waiting one rotation.

The circuit 702 in the above-mentioned embodiments monitors the absolute value of signal TE3 to detect the deviation by paying attention to whether the absolute value of signal TE3 exceeds the threshold value $V_{th}$. However, the detecting method of the deviation may not be limited thereto. For example, a time period $T_{th2}$ during which the absolute value of signal TE3 exceeds the predetermined threshold value $V_{th2}$ may be measured to detect the deviation by paying attention to whether the time period $T_{th2}$ exceeds a predetermined value.

The deviation detecting circuit 113 in the above-mentioned embodiments has the band-pass filter 701 therein to generate the rotation frequency component caused by the eccentricity and the signal TE3 attenuated a high frequency noise component through the band-pass filter 701 and thereby detect the deviation. However, since an amplitude of the eccentricity component contained in the signal TE2 is generally small, a low-pass filter may be used in place of the band-pass filter 701 to attenuate the noise alone.

Paying attention to that the signal waveform stored in N pieces of memory circuit 201 configuring the delay memory circuit 111 corresponds to a signal waveform of the immediately preceding one rotation amount being limited to the signal TE2 by the band through the low-pass filter 110, the deviation detecting circuit 113 in the above-mentioned embodiments may fetch the value saved in the memory circuit 201 to detect the deviation by using this value.

In the above-mentioned embodiments, the value of variable gain device 112 is set to 0.5 in the steady state, and the value of variable gain device 112 in the rotation phase at which the deviation is detected is set to 1 at which the suppression effect becomes maximum, but other values may be used. For example, the value of variable gain device 112 may be set to 0.8 in the rotation phase at which the deviation is detected.

The deviation detecting circuit 113 in the above-mentioned embodiments detects the deviation by using the signal TE2 as being an output signal from the adder 106, however, may detect it by using the other signal from the servo loop. It is desirable that the signal to be used for detecting the deviation is of a succeeding stage rather than that from the adder 106. This is because the deviation is suppressed in the signal TE1 in a preceding stage of the adder 106 and the signal TE1 is therefore inappropriate as a signal to detecting whether the deviation is present or absent, in a condition applicable to the iterative learning control in which the value K of variable gain device 112 is close to 1. In this regard, it is possible to detect the deviation by also using the signal TE1 when using a smaller value than 1 as the value K of variable gain device 112 in the rotation phase at which the deviation is detected. Therefore, the deviation detecting circuit 113 may detect the deviation by using the drive signal TRD as a signal which is compensated for a gain and a phase to the signal TE2 by the tracking control circuit 107.

In the above-mentioned embodiments, the variable gain device 112 is connected to the succeeding stage of the delay memory circuit 111, however, it may be connected to any position of the iterative learning control loop. For example, the variable gain device 112 may be inserted into immediately preceding stage of the low-pass filter 110, not the succeeding state of the delay memory circuit 111.

Further, the iterative learning control in the above-mentioned embodiments is configured that the tracking error signal is fetched to then add the compensation signal thereto, however, the drive signal TRD may be fetched to add the compensation signal thereto. Furthermore, the iterative learning control may be configured that an internal signal of a tracking control unit may be fetched to add the compensation signal thereto.

The iterative learning control in the above-mentioned embodiments is configured that one rotation is divided into N to then store its signal values. However, the invention is similarly applicable to the iterative learning control for storing the signals equal to or greater than one rotation.

In the above-mentioned embodiments, the value of variable gain device 112 is increased on the iterative learning control loop in the rotation phase at which the deviation is detected. However, a purpose of the invention uses the iterative learning control, which increases the suppression degree against the frequency disturbance in terms of the integral multiple of the rotation frequency, rather than the steady state in the rotation phase at which the deviation is detected, but the suppression degree may be increased by methods other than the variation of gain.

Further, as disclosed in the JP-A-2001-126421, it is apparent that the invention is similarly applicable to the iterative learning control having a different configuration from the iterative learning control mentioned above the embodiments in the description, by using the characteristic of iterative learning control which increases the suppression degree against the frequency disturbance in terms of the integral multiple of the rotation frequency rather than the steady state, in the rotation phase at which the deviation is detected.

It is also apparent that the invention is similarly applicable to a focusing control of the optical disk apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A disk apparatus that irradiates a laser beam on an optical disk to record and/or reproduce information, comprising:
    an optical detector unit that outputs an electric signal in response to a reflected beam amount from the optical disk;
    a servo error signal generating unit that generates a servo error signal from an output signal of the optical detector unit;
    a feed back control unit that generates a drive signal to drive a servo actuator in accordance with the servo error signal and perform a feed back control;
    a disk rotation unit that rotates the optical disk;
    a rotation phase detecting unit that detects a rotation phase of the disk rotation unit;
    an iterative learning control unit that has a suppression effect against a frequency disturbance of integer multiple of a rotation frequency;
    an adder unit that adds an output signal from the iterative learning control unit to a first predetermined signal on a servo loop; and
    a servo deviation detecting unit that detects a servo deviation by using a second predetermined signal on the servo loop to store a range, in which the servo deviation is detected, of the rotation phase as a servo deviation detected phase range,
    wherein a suppression degree of the iterative learning control unit increases against the frequency disturbance of integer multiple of rotation frequency, for a time period during which the rotation phase becomes within a predetermined rotation phase range including the servo deviation detected phase range.

2. The apparatus according to claim 1 wherein the suppression degree of the iterative learning control is varied sequentially to a plurality of suppression degrees with a time elapsed, when varying the suppression degree of the iterative learning control unit at a leading or trailing portion of the predetermined rotation phase range.

3. The apparatus according to claim 1 wherein the servo deviation detecting unit detects the servo deviation by a result when an absolute value of a signal being limited to a band through a low-pass filter for the second predetermined signal becomes equal to or greater than a predetermined value.

4. The apparatus according to claim 1 wherein the servo deviation detecting unit detects the servo deviation by a result when an absolute value of a signal being limited to a band through a band-pass filter for the second predetermined signal becomes equal to or greater than a predetermined value.

5. The apparatus according to claim 1 wherein the servo deviation detecting unit detects as a single servo deviation when a plurality of servo deviations are detected during a predetermined time period to store the servo deviation detected phase range of at least one rotation amount and increase a value of a compensation signal gain device for the time period during which the rotation phase becomes the predetermined rotation phase range including the servo deviation detected phase range, in accordance with the servo deviation detected phase range of a preceding one rotation.

6. The apparatus according to claim 1 wherein the servo deviation detecting unit detects the servo deviation in the range of the rotation phase in common over at least two successive rotations to store consequently the range of the common rotation phase as the servo deviation detected phase range.

7. The apparatus according to claim 1 wherein the second predetermined signal is a signal of a succeeding stage from the adder unit on the servo loop.

8. The apparatus according to claim 1 wherein the second predetermined signal is an output signal from the adder unit.

9. A disk apparatus that irradiates a laser beam on an optical disk to record and/or reproduce information, comprising:
    an optical detector unit that outputs an electric signal in response to a reflected beam amount from the optical disk;
    a servo error signal generating unit that generates a servo error signal from an output signal of the optical detector unit;
    a feed back control unit that generates a drive signal to drive a servo actuator in accordance with the servo error signal and perform a feed back control;
    a disk rotation unit that rotates the optical disk;

a rotation phase detecting unit that detects a rotation phase of the disk rotation unit;

an adder unit that adds a compensation signal for compensating a periodic disturbance entered into a servo system in the optical disk apparatus to a first predetermined signal on a servo loop;

a compensation signal generating unit that generates the compensation signal from an output signal of the adder unit; and a servo deviation detecting unit that detects a servo deviation by using a second predetermined signal on the servo loop to store a range, in which a servo deviation is detected, of the rotation phase as a servo deviation detected phase range, wherein the compensation signal generating unit includes a memory unit that stores a signal entered over at least one rotation amount of the optical disk to output a waveform of the stored signal after a predetermined time period, and a compensation signal gain device that performs an amplification and an attenuation of an amplitude for the entered signal, and a value of the compensation signal gain device increases for a time period during which the rotation phase becomes a predetermined rotation phase range including the servo deviation detected phase range.

10. The apparatus according to claim 9 wherein the compensation signal generating unit includes a low-pass filter, and the memory unit stores an output signal of the low-pass filter.

11. The apparatus according to claim 9 wherein the value of the compensation signal gain device is varied sequentially to a plurality of values with a time elapsed, when varying the value of the compensation signal gain device at a leading or trailing portion of the predetermined rotation phase range.

12. A disk apparatus that irradiates a laser beam on an optical disk to record and/or reproduce information, comprising:

an optical detector unit that outputs an electric signal in response to a reflected beam amount from the optical disk;

a servo error signal generating unit that generates a servo error signal from an output signal from the optical detector unit;

a feed back control unit that generates a drive signal to drive a servo actuator in accordance with the servo error signal and perform a feed back control;

a disk rotation unit that rotates the optical disk;

a rotation phase detecting unit that detects a rotation phase of the disk rotation unit;

an adder unit that adds a compensation signal for compensating a periodic disturbance entered into a servo system in the optical disk apparatus to a first predetermined signal on a servo loop;

a compensation signal generating unit that generates the compensation signal from an output signal of the adder unit; and a servo deviation detecting unit detects a servo deviation by using a value stored in a memory unit to store a range, in which the servo deviation is detected, of the rotation phase as a servo deviation detected phase range, wherein the compensation signal generating unit includes the memory unit that stores a signal entered over at least one rotation amount of the optical disk to output a waveform of the stored signal after a predetermined time period, and a compensation signal gain device that performs an amplification and an attenuation of an amplitude for the entered signal, and a value of the compensation signal gain device increases for a time period during which the rotation phase becomes a predetermined rotation phase range including the servo deviation detected phase range.

13. A disk apparatus that irradiates a laser beam on an optical disk to record and/or reproduce information, comprising:

an optical detector unit that outputs an electric signal in response to a reflected beam amount from the optical disk;

a servo error signal generating unit that generates a servo error signal from an output signal of the optical detector unit;

a feed back control unit that generates a drive signal to drive a servo actuator in accordance with the servo error signal and perform a feed back control;

a disk rotation unit that rotates the optical disk;

an iterative learning control unit that has a suppression effect against a frequency disturbance of integer multiple of a rotation frequency;

an adder unit that adds an output signal from the iterative learning control unit to a first predetermined signal on a servo loop; and a servo deviation detecting unit that detects a servo deviation by using a second predetermined signal on the servo loop, wherein a suppression degree of the iterative learning control unit increases against the frequency disturbance of integer multiple of rotation frequency, for a time period during which the servo deviation was detected by the servo deviation detecting unit.

14. The apparatus according to claim 13 wherein the suppression degree of the iterative learning control is varied sequentially to a plurality of suppression degrees with a time elapsed, when varying the suppression degree of the iterative learning control unit at a leading or trailing portion of the predetermined rotation phase range.

15. The apparatus according to claim 13 wherein the servo deviation detecting unit detects the servo deviation by a result when an absolute value of a signal being limited to a band through a low-pass filter for the second predetermined signal becomes equal to or greater than a predetermined value.

16. The apparatus according to claim 13 wherein the servo deviation detecting unit detects the servo deviation by a result when an absolute value of a signal being limited to a band through a band-pass filter for the second predetermined signal becomes equal to or greater than a predetermined value.

17. The apparatus according to claim 13 wherein the second predetermined signal is a signal of a succeeding stage from the adder unit on the servo loop.

18. The apparatus according to claim 13 wherein the second predetermined signal is an output signal from the adder unit.

* * * * *

UNITED STATES PATENT AND TRADEMARK OFFICE
CERTIFICATE OF CORRECTION

PATENT NO. : 8,085,630 B2
APPLICATION NO. : 12/622122
DATED : December 27, 2011
INVENTOR(S) : Shinsuke Onoe It is certified that error appears in the above-identified patent and that said Letters Patent is hereby corrected as shown below:

On the Title Page

In the bibliographic data at Item (75) Inventors,

"Shisuke Onoe, Fujisawa (JP)"

should read,

--Shinsuke Onoe, Fujisawa (JP)--

Signed and Sealed this
Twenty-first Day of August, 2012

David J. Kappos
*Director of the United States Patent and Trademark Office*